US010764047B2

(12) United States Patent
Grubin et al.

(10) Patent No.: US 10,764,047 B2
(45) Date of Patent: *Sep. 1, 2020

(54) SYNCHRONIZABLE HARDWARE SECURITY MODULE

(71) Applicant: Amazon Technologies, Inc., Seattle, WA (US)

(72) Inventors: Benjamin Philip Grubin, Herndon, VA (US); Benjamin Samuel, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,874

(22) Filed: Apr. 15, 2019

(65) Prior Publication Data

US 2019/0238333 A1   Aug. 1, 2019

Related U.S. Application Data

(63) Continuation of application No. 15/379,405, filed on Dec. 14, 2016, now Pat. No. 10,263,778.

(51) Int. Cl.
*H04L 9/08* (2006.01)
*H04L 9/12* (2006.01)
(Continued)

(52) U.S. Cl.
CPC ............. *H04L 9/12* (2013.01); *H04L 9/0643* (2013.01); *H04L 9/0822* (2013.01);
(Continued)

(58) Field of Classification Search
CPC ....... H04L 9/12; H04L 9/0643; H04L 9/0822; H04L 9/0866
(Continued)

(56) References Cited

U.S. PATENT DOCUMENTS 5,850,444 A    12/1998 Rune
8,503,681 B1 *  8/2013 McGrew ............... H04L 63/065
                                                           380/277
(Continued)

FOREIGN PATENT DOCUMENTS

EP    2337300 A1    6/2011

OTHER PUBLICATIONS

Xiang Fu; Synchronizability of Conversations among Web Services; IEEE; 2005; p. 1042-1055.*
(Continued)

*Primary Examiner* — Monjur Rahim
(74) *Attorney, Agent, or Firm* — Davis Wright Tremaine LLP

(57) ABSTRACT

An HSM cluster includes a set of hardware security modules that maintain a set of cryptographic keys that are synchronized across the HSM cluster. Individual applications running on client computer systems access the HSM cluster using HSM duster clients running on the client computer systems. The HSMs are accessed via a set of HSM cluster servers that monitor the synchronization of the cryptographic keys. Synchronization of the HSMs is maintained by the HSM cluster clients. If the HSM cluster loses synchronization, an HSM cluster client resynchronizes the HSM cluster by acquiring a list of keys and key versions stored on each HSM, and generating an update map. Using the update map, the HSM client obtains, form various HSM in the HSM cluster, the latest versions of the out-of-date keys in an encrypted form. The HSM cluster client assembles and distributes updates to each HSM in the HSM cluster.

20 Claims, 17 Drawing Sheets

(51) Int. Cl.

| | |
|---|---|
| *H04L 29/06* | (2006.01) |
| *H04L 9/16* | (2006.01) |
| *H04L 9/30* | (2006.01) |
| *H04L 9/32* | (2006.01) |
| *H04L 9/06* | (2006.01) |
| *H04L 29/08* | (2006.01) |

(52) U.S. Cl.
CPC .......... *H04L 9/0833* (2013.01); *H04L 9/0841* (2013.01); *H04L 9/0866* (2013.01); *H04L 9/0891* (2013.01); *H04L 9/0897* (2013.01); *H04L 9/16* (2013.01); *H04L 9/30* (2013.01); *H04L 9/3247* (2013.01); *H04L 9/3263* (2013.01); *H04L 63/0435* (2013.01); *H04L 63/061* (2013.01); *H04L 63/123* (2013.01); *H04L 67/1095* (2013.01); *H04L 2209/12* (2013.01); *H04L 2463/062* (2013.01)

(58) Field of Classification Search
USPC .......................................................... 380/283
See application file for complete search history.

(56) References Cited

U.S. PATENT DOCUMENTS

| | | | | |
|---|---|---|---|---|
| 8,824,686 | B1* | 9/2014 | Ishii | H04L 9/08 380/243 |
| 9,843,447 | B1 | 12/2017 | Bishop et al. | |
| 9,979,726 | B2 | 5/2018 | Freitas FOrtuna dos Santos et al. | |
| 2001/0006552 | A1* | 7/2001 | Salokannel | H04L 63/06 380/272 |
| 2006/0210080 | A1* | 9/2006 | Tuyls | H04K 1/00 380/274 |
| 2007/0022469 | A1* | 1/2007 | Cooper | H04L 12/2898 726/3 |
| 2008/0127327 | A1* | 5/2008 | Carrasco | H04L 63/0272 726/15 |
| 2012/0008778 | A1* | 1/2012 | Mayer | H04L 9/12 380/255 |
| 2012/0023329 | A1 | 1/2012 | Yamamoto et al. | |
| 2012/0237024 | A1 | 9/2012 | Liu et al. | |
| 2015/0052358 | A1 | 2/2015 | Udupi et al. | |
| 2015/0082041 | A1 | 3/2015 | Gaspar Cuevas | |
| 2015/0163206 | A1 | 6/2015 | McCarthy et al. | |
| 2015/0358161 | A1* | 12/2015 | Kancharla | H04L 63/0485 713/164 |
| 2015/0358312 | A1* | 12/2015 | Kancharla | G06F 21/335 713/156 |
| 2016/0065548 | A1* | 3/2016 | Brouwer | H04L 67/104 713/171 |
| 2016/0344711 | A1 | 11/2016 | Rokui et al. | |
| 2017/0052907 | A1* | 2/2017 | Price, Jr. | G06F 21/72 |
| 2017/0195299 | A1* | 7/2017 | James | H04L 63/0442 |
| 2018/0076958 | A1 | 3/2018 | Narimoto et al. | |
| 2018/0167208 | A1 | 6/2018 | Le Saint et al. | |

OTHER PUBLICATIONS

Atkinson, "IP Authentication Header," Request for Comments: 1826, Standards Track, Aug. 1995, 14 pages.
Atkinson, "IP Encapsulating Security Payload (ESP)," Request for Comments: 1827, Standards Track, Aug. 1995, 13 pages.
Atkinson, "Security Architecture for the Internet Protocol," Request for Comments: 1825, Standards Track, Aug. 1995, 23 pages.
Blake-Wilson et al., "Elliptic Curve Cryptography (ECC) Cipher Suites for Transport Layer Security (TLS)," Request for Comments: 4492, Informational, May 2006, 36 pages.
Blake-Wilson et al., "Transport Layer Security (TLS) Extensions," Request for Comments: 3546, Standards Track, Jun. 2003, 28 pages.
Blake-Wilson et al., "Transport Layer Security (TLS) Extensions," Request for Comments: 4366, Standards Track, Apr. 2006, 29 pages.
Blumenthal et al., "Pre-Shared Key (PSK) Ciphersuites with NULL Encryption for Transport Layer Security (TLS)," Request for Comments: 4785, Standards Track, Jan. 2007, 6 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 8 pages.
Dang, "Recommendation for Applications Using Approved Hash Algorithms" NIST Special Publication 800-107, Revision 1, National Institute of Standards and Technology (NIST), Aug. 2012, retrieved on Nov. 24, 2015, from https://nvlpubs.nist.gov/nistpubs/Legacy/SP/nistspecialpublication800-107r1.pdf, 25 pages.
Dierks et al., "The TLS Protocol Version 1.0," Request for Comments: 2246, Standards Track, Jan. 1999, 75 pages.
Dierks et al., "The Transport Layer Security (TLS) Protocol Version 1.2," Request for Comments: 5246, Standards Track, Aug. 2008, 98 pages.
Eastlake, "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments: 4279, Standards Track, Dec. 2005, 16 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Housley, "Using Advanced Encryption Standard (AES) CCM Mode With IPsec Encapsulating Security Payload (ESP)," Request for Comments: 4309, Standards Track, Dec. 2005, 14 pages.
Kanno et al., "Addition of the Camellia Cipher Suites to Transport Layer Security (TLS)," Request for Comments: 6367, Informational, Sep. 2011, 9 pages.
Karn et al., "The ESP DES-CBC Transform," Request for Comments: 1829, Standards Track, Aug. 1995, 11 pages.
Kato et al., "Camellia Cipher Suites for TLS," Request for Comments: 5932, Standards Track, Jun. 2010, 7 pages.
Kent et al., "Security Architecture for the Internet Protocol," Request for Comments: 2401, Standards Track, Nov. 1998, 62 pages.
Kent et al., "Security Architecture for the Internet Protocol," Request for Comments: 4301, Standards Track, Dec. 2005, 102 pages.
Kent, "IP Encapsulating Security Payload (ESP)," Request for Comments: 4303, Standards Track, Dec. 2005, 45 pages.
Khare et al., "Upgrading to TLS Within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 10 pages.
Lee et al., "Addition of SEED Cipher Suites to Transport Layer Security (TLS)," Request for Comments: 4162, Standards Track, Aug. 2005, 7 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 9 pages.
McGrew et al., "AES-CCM Cipher Suites for Transport Layer Security (TLS)," Request for Comments: 6655, Standards Track, Jul. 2012, 8 pages.

(56) References Cited

OTHER PUBLICATIONS

McGrew et al., "Datagram Transport Layer Security (DTLS) Extension to Establish Keys for the Secure Real-time Transport Protocol (SRTP)," Request for Comments: 5764, Standards Track, May 2010, 27 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 11 pages.
Metzger et al., "IP Authentication Using Keyed MD5," Request for Comments: 1828, Standards Track, Aug. 1995, 6 pages.
Monchiero et al., "Power/performance hardware optimization for synchronization intensive applications in MPSoCs," Proceedings of the Design Automation & Test in Europe Conference, Mar. 6, 2006, 6 pages.
Moriai et al., "Addition of Camellia Cipher Suites to Transport Layer Security (TLS)," Request for Comments: 4132, Standards Track, Jul. 2005, 8 pages.
Newman, "Using TLS with IMAP, POP3 and ACAP," Request for Comments: 2595, Standards Track, Jun. 1999, 16 pages.
Orman, "The Oakley Key Determination Protocol," Request for Comments: 2412, Informational, Nov. 1998, 56 pages.
Phelan, "Datagram Transport Layer Security (DTLS) over the Datagram Congestion Control Protocol (DCCP)," Request for Comments: 5238, Standards Track, May 2008, 11 pages.
Rescorla et al., "Datagram Transport Layer Security Version 1.2," Request for Comments: 6347, Standards Track, Jan. 2012, 33 pages.
Rescorla et al., "Datagram Transport Layer Security," Request for Comments: 4347, Standards Track, Apr. 2006, 26 pages.
Rescorla et al., "Transport Layer Security (TLS) Renegotiation Indication Extension," Request for Comments: 5746, Standards Track, Feb. 2010, 16 pages.
Rescorla, "HTTP Over TLS," Request for Comments: 2818, Informational, May 2000, 8 pages.
Rescorla, "TLS Elliptic Curve Cipher Suites with SHA-256/384 and AES Galois Counter Mode (GCM)," Request for Comments: 5289, Informational, Aug. 2008, 7 pages.
Safenet HSM, "Overview of Luna High Availability and Load Balancing," Revision A, Safenet, Inc., The Data Protection Company, © 2013, pp. 1-8.
Salowey et al., "AES Galois Counter Mode (GCM) Cipher Suites for TLS," Request for Comments: 5288, Standards Track, Aug. 2008, 9 pages.
Salowey et al., "Transport Layer Security (TLS) Session Resumption without Server-Side State," Request for Comments: 5077, Standards Track, Jan. 2008, 21 pages.
Salter et al., "Suite B Profile for Transport Layer Security (TLS)," Request for Comments: 6460, Informational, Jan. 2012, 15 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 10 pages.
Taylor et al., "Using the Secure Remote Password (SRP) Protocol for TLS Authentication," Request for Comments: 5054, Informational, Nov. 2007, 25 pages.
Tuexen et al., "Datagram Transport Layer Security (DTLS) for Stream Control Transmission Protocol (SCTP)," Request for Comments: 6083, Standards Track, Jan. 2011, 10 pages.
Turner et al., "Prohibiting Secure Sockets Layer (SSL) Version 2.0," Request for Comments: 6176, Standards Track, Mar. 2011, 4 pages.

\* cited by examiner

SYNCHRONIZABLE HARDWARE SECURITY MODULE

CROSS-REFERENCE TO RELATED APPLICATIONS

This application is a continuation of U.S. patent application Ser. No. 15/379,405, filed on Dec. 14, 2016, entitled "SYNCHRONIZABLE HARDWARE SECURITY MODULE," the disclosure of which is incorporated herein by reference in its entirety. This application also incorporates by reference for all purposes the full disclosures of co-pending U.S. patent application Ser. No. 15/379,396, filed Dec. 14, 2016, now U.S. Pat. No. 10,425,225, entitled "SYNCHRONIZABLE HARDWARE SECURITY MODULE" and co-pending U.S. patent application Ser. No. 15/379,402, filed Dec. 14, 2016, now U.S. Pat. No. 10,313,402, entitled "SYNCHRONIZABLE HARDWARE SECURITY MODULE."

BACKGROUND

Maintaining the security of computer systems is a difficult problem. One way that computer systems are secured is through the use of cryptography. Cryptographic systems rely on one or more cryptographic keys to protect information. In many situations the security of the cryptographic keys is paramount because access to the cryptographic keys allows access to the data that is being protected. One way that cryptographic keys can be secured is through the use of a Hardware Security Module ("HSM"). Generally speaking, an HSM may be a physical computing device that safeguards cryptographic keys by storing the cryptographic keys within a tamper-resistant physical device. HSMs provide cryptographic key generation and storage and perform cryptographic operations for authorized clients of the HSM. In general, cryptographic keys are not exportable from the HSM in an unprotected form.

In large-scale computing environments, the demand for cryptographic operations may exceed the capabilities of a single HSM. To improve the performance of a distributed computing environment, multiple HSMs may be used to provide cryptographic functions to various servers and clients throughout the distributed environment, and cryptographic keys may be synchronized between the multiple HSMs. Synchronizing cryptographic keys across multiple HSMs can be difficult, because security features of the HSMs make it difficult to transfer information directly from one HSM in the fleet to another HSM in the fleet in an unencrypted form.

BRIEF DESCRIPTION OF THE DRAWINGS

Various techniques will be described with reference to the drawings, in which.

DETAILED DESCRIPTION

Figure 1:
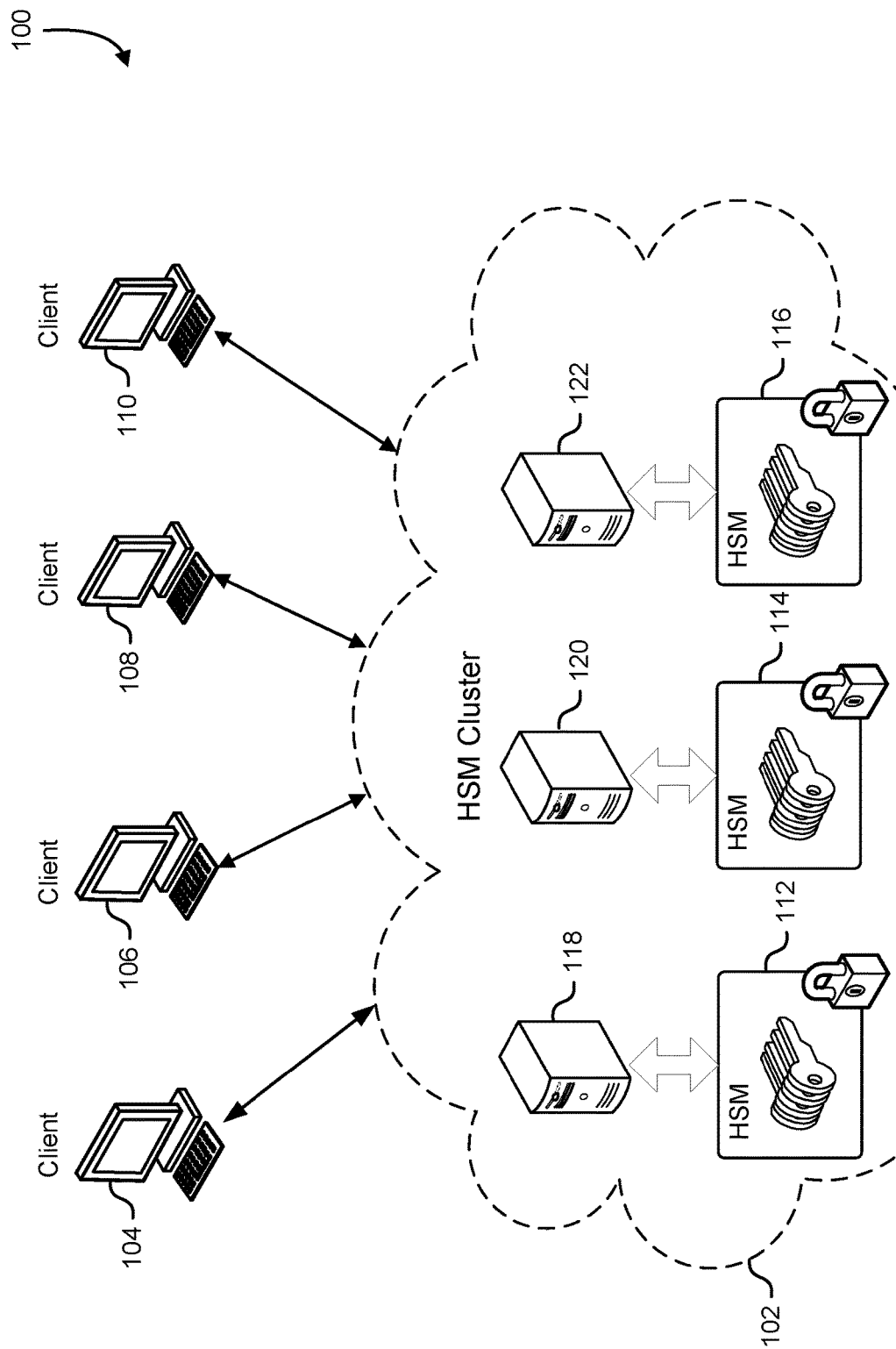
FIG. 1 shows an illustrative example of an environment in which various embodiments may be practiced.

The current document describes a system that improves the reliability and performance of cryptographic processing by providing an HSM cluster that replicates a set of cryptographic keys across a set of hardware security modules ("HSMs"). The HSM cluster provides improved cryptographic capacity to client computer systems which are able to distribute cryptographic operations to more than one HSM in the HSM cluster. Each HSM in the HSM cluster is connected to an HSM cluster server. Each HSM cluster server monitors the health of the HSM cluster and, when appropriate, performs actions to re-synchronize the set of cryptographic keys stored on the HSMs in the HSM cluster.

An application hosted on a particular client computer system accesses the HSM cluster via an HSM cluster client running on the particular client computer system. The HSM cluster client may communicate with the HSMs in the cluster, to perform cryptographic operations or manage cryptographic keys, through one or more of the HSM cluster servers. The HSM cluster clients attempt to maintain the synchronization of the cryptographic keys on the HSM cluster by coordinating key addition, key deletion, and key modification operations. If the HSM cluster loses synchronization, the HSM cluster servers, in coordination with the individual HSMs in the HSM cluster, detect the loss of synchronization, and perform operations to restore synchronization of the cryptographic keys in the HSMs.

While the HSM cluster is synchronized, an application may perform a cryptographic operation using various HSMs in the HSM cluster. An HSM cluster client running on a client computer system provides an interface between an application running on the client computer system and the HSM cluster. The application submits a cryptographic request to the HSM cluster by calling an application programming interface ("API") provided by the HSM cluster client. The HSM cluster client selects a particular HSM in the HSM cluster to fulfill the cryptographic request. The HSM cluster client may select the particular HSM based at least in part on the load of the particular HSM compared to other HSMs in the HSM cluster, the connectivity of the particular HSM compared to the connectivity of other HSMs in the HSM cluster, or particular cryptographic capabilities of the particular HSM.

The HSM cluster client forwards the cryptographic request to an HSM cluster server associated with a particular HSM. The HSM cluster server is a computer system, network appliance, or other computing device that acts as a host for the particular HSM. In some examples, the HSM cluster server is a personal computer system and the particular HSM is a Peripheral Component Interconnect ("PCI") card installed in the personal computer system. In another example, the HSM cluster server is a personal computer system and the particular is an HSM connected to the personal computer system via a USB or FireWire cable. In yet another example, the HSM cluster server is a computer server, the particular HSM is a network-connected HSM, and the computer server manages the network-connected HSM via a network connection. In some implementations, the HSM cluster server provides information to the HSM cluster client that describes the current cryptographic processing load of the particular HSM, the synchronization state of the particular HSM, or other information that helps the HSM cluster client select the particular HSM from other HSMs in the HSM cluster.

The HSM cluster server forwards the cryptographic request to the selected HSM. The selected. HSM fulfills the cryptographic request by performing an associated cryptographic operation, and the results of the cryptographic operation are returned to the application via the HSM cluster server and the HSM cluster client. In various examples, the cryptographic request may be a request to encrypt data, decrypt data, generate a cryptographic signature, or verify a cryptographic signature, using a cryptographic key maintained on the selected HSM. Information transferred between the selected HSM and the application may be protected by establishing a cryptographically protected network connection between the HSM and the application. In some examples, the cryptographic protected network connection is a Transport Layer Security ("TLS") network connection.

Applications are able to use the HSM cluster to generate new cryptographic keys. To generate a new cryptographic key on the HSM cluster, an application submits a key-generation request to the HSM cluster client. The HSM cluster client selects a particular HSM in the HSM cluster to fulfill the key-generation request. The particular HSM may be selected based at least in part on a measured reliability and availability of the particular HSM compared to other HSMs in the HSM cluster. The HSM cluster client forwards the key-generation request to an HSM cluster server associated with the particular HSM. A prefix for the name of the new cryptographic key is generated based at least in part on the identity of the particular HSM. In some examples, the prefix is generated by the HSM. In some implementations, each HSM in the HSM cluster is assigned a prefix that is unique within the HSM cluster, and the prefix is the prefix associated with the particular HSM. In another implementation, each HSM in the HSM cluster is assigned a non-overlapping range of prefixes, and the prefixes are selected from the range of prefixes associated with the particular HSM. The HSM cluster server sends the key-generation request to the particular HSM with the prefix.

The particular HSM generates a new key in accordance with the key-generation request. The new key has an associated key identifier that includes the supplied prefix. The particular HSM returns the key identifier to the HSM cluster server, an encrypted version of the new cryptographic key, and any status information associated with the key-generation request. The encrypted version of the new cryptographic key is encrypted with a cluster key stored on the HSMs in the HSM cluster in plaintext form. The cluster key is used to share cryptographic information between HSMs in the HSM fleet. The HSM cluster server returns the status information and the key identifier to the application via the HSM cluster client. By using a prefix associated with the selected HSM for new cryptographic keys, the HSM cluster prevents the creation of different keys that have matching identifiers.

After receiving the encrypted version of the new cryptographic key, the key identifier, and the status information from the particular HSM, the HSM cluster client performs actions to replicate the new cryptographic key across the HSM cluster. The HSM cluster client identifies the additional HSMs in the HSM cluster and sends a key-replication request to an HSM cluster server associated with each of the additional HSMs. Each key-replication request includes the encrypted version of the new cryptographic key and the key identifier. Each HSM cluster server forwards the key-replication request to an associated HSM. The associated HSM uses the cluster key to acquire the new cryptographic key from the encrypted version of the new cryptographic key, and stores the new cryptographic key in association with the key identifier provided with the key-replication request.

In some examples, if the new cryptographic key cannot be generated and replicated across all HSMs in the HSM cluster, the creation of the new cryptographic key will be deemed successful as long as the new cryptographic key is replicated to a quorum of HSMs in the HSM cluster. A quorum of HSMs may be a threshold number of HSMs, a threshold percentage of total HSMs in the HSM cluster, or a core subset of HSMs in the HSM cluster. In various implementations, missing keys are detected by the HSM cluster servers, and replicated across the HSM cluster in the background by the HSM cluster servers. If the new cryptographic key cannot be generated and replicated across to a quorum of HSMs in the HSM cluster, the generation of the new cryptographic key fails.

Deleting a cryptographic key from the HSM cluster is accomplished by applying a tombstone, or pending deletion flag, to the cryptographic key to be deleted, and synchronizing the tombstone across the HSM cluster. To delete a cryptographic key from the HSM cluster, an application submits a tombstone request for a particular cryptographic key to the HSM cluster client on the client computer system hosting the application. The HSM cluster client submits the tombstone request to each HSM in the HSM cluster via the HSM cluster servers. The tombstone is registered by each HSM in the HSM cluster, thereby blocking further access to the cryptographic key. After the HSM cluster is determined to be in a synchronized state and the tombstone is replicated across all HSMs in the sum cluster, the HSM cluster servers cause the HSMs in the HSM cluster to commit the tombstone by deleting the tombstones and the associated cryptographic keys. In some implementations, key identifiers associated with deleted cryptographic keys may be reused by the HSM cluster after the tombstone has been cleared.

Modification of a cryptographic key retained in the HSM cluster may be accomplished when the HSM cluster is in a synchronized state. Modification of a cryptographic key may involve modification of key properties or modification of the cryptographic key itself. An application on a client computer system submits a modification request to an HSM cluster client on the client computer system. The HSM cluster client determines the state of the HSM cluster, and if the HSM cluster is not in a synchronized state, the HSM cluster client may either block the request while the HSM cluster is synchronized or fail the modification request. If the HSM cluster client determines that the HSM cluster is not in a synchronized state, the HSM cluster client may signal to one or more HSM cluster servers associated with the HSM cluster that synchronization is requested.

Once the HSM cluster is synchronized, the HSM cluster client submits a lock request to the HSM cluster servers that prevents operations from being performed using the cryptographic key to be modified. If the lock is successful, the HSM cluster client submits the modification request to the HSMs in the HSM cluster via the HSM cluster servers. If all of the HSMs in the HSM cluster confirm that the modification has been successfully performed, the HSM cluster client releases the lock on the HSM cluster, and the request is successful. If the modification is not successfully performed by all of the HSMs in the HSM cluster, the modification fails and the HSM cluster client submits a rollback request to the HSMs to return the HSM cluster to a consistent state.

In some implementations, the HSM cluster client examines the particular cryptographic key to be modified and identifies the HSM that created the particular cryptographic key using a prefix of a key identifier associated with the particular cryptographic key. The HSM that created the particular cryptographic key is designated as the master HSM for performing modifications to the particular cryptographic key. The HSM cluster client submits the modification request to an HSM cluster server associated with the master HSM, and the HSM cluster server submits the modification request to the master HSM. The master HSM fulfills the modification request, returning status to the HSM cluster server as well as an encrypted version of the modified cryptographic key. The HSM cluster client submits the modified cryptographic key to the remaining HSMs in the HSM cluster and, if necessary, the HSM cluster servers synchronize the modified cryptographic key across the HSMs in the HSM cluster. If the HSM cluster loses synchronization and different versions of the modified key are stored on the HSM cluster, the version of the modified key on the master HSM controls and is replicated across the HSM cluster.

The synchronization state of the cryptographic keys maintained on the HSM cluster may be monitored by the HSM cluster servers. Each HSM cluster server manages one or more associated HSMs. The cluster server requests that each HSM managed by the HSM cluster server return a hash value of the cryptographic keys maintained in the HSM. The HSM cluster server compares the hash values provided by each HSM to the remaining HSMs in the HSM cluster. If all HSMs in the HSM fleet have matching hash values, the HSM cluster server determines that the HSM cluster is synchronized. If the HSM cluster server receives different hash values from different HSMs in the HSM fleet, the HSM cluster server determines that the HSM cluster is not synchronized. The synchronization state of the HSM cluster is reevaluated periodically by each HSM cluster server and may be reported to HSM cluster clients when they interact with the HSM cluster.

In some situations, the cryptographic keys retained in the HSM cluster may become unsynchronized, and a resynchronization operation may be performed by an HSM cluster client. If an HSM cluster client receives an indication from an HSM cluster server that the HSM cluster is not synchronized, the HSM cluster client may interrogate the HSMs in the HSM cluster to identify cryptographic keys that are not fully replicated across the HSM cluster and replicate the identified cryptographic keys to restore synchronization. In some implementations, and HSM cluster server identifies cryptographic keys that are not fully replicated across the HSM cluster and replicates the identified cryptographic keys to restore synchronization to the HSM cluster.

FIG. 1 shows an illustrative example of an environment in which various embodiments may be practiced. An environment 100 shows an HSM cluster 102 that provides cryptographic services to applications running on a number of client computer systems 104, 106, 108, and 110. The client computer systems may be personal computer systems, computer servers, virtual computer systems, server clusters, computing appliances, handheld devices, mobile phones, tablet computers, or other network-connected devices capable of communicating with the HSM cluster 102. An individual client computer system may host one or more client applications, and each application on the individual client computer system uses a HSM cluster client to communicate with the HSM cluster. The HSM cluster client is a service running on the individual client computer system that implements an API which is made available to the one or more applications. Through the API, the HSM cluster client receives requests to perform cryptographic operations from the one or more applications.

The HSM cluster 102 includes a number of HSMs connected to a number of HSM cluster servers. The HSMs include protected storage that holds cryptographic keys and a cryptoprocessor. In many implementations, the cryptographic keys are maintained in non-exportable storage that prevents the cryptographic keys from being exported in an unencrypted form. The HSMs are connected to a corresponding number of HSM cluster servers. The HSM cluster servers act as host computer systems for the HSMs and provide an interface between the HSMs and the HSM cluster clients. In some examples, the HSM is a PC card installed in a personal computer system, and the corresponding HSM cluster server is a service running on the personal computer system. In another example, the HSM is a USB-connected HSM that is connected to a personal computer system, and the personal computer system hosts the corresponding HSM cluster server as a service. In yet another implementation, the HSM is a network connected HSM, and the corresponding HSM cluster server is hosted on a network connected computer system, computer server, or virtual computer system. The HSM cluster 102 includes a first HSM 112, a second HSM 114, and a third HSM 116. The first HSM 112 is connected to a first HSM cluster server 118, the second HSM 114 is connected to a second HSM cluster server 120, and the third HSM 116 is connected to a third HSM cluster server 122.

The HSMs within the HSM cluster share a common cluster key that allows the HSMs to transfer keys between HSMs within the HSM cluster 102 in an encrypted form. In some examples, the cluster key is installed in the HSMs when the HSMs are manufactured. In another example, a trust ceremony is performed by the customer to transfer the common cluster key from one HSM to another. In yet another example, the cluster key is transferred from one HSM to another using secure physical media.

The cryptographic keys maintained by the HSM cluster 102 are replicated across the HSMs in the cluster by the HSM cluster clients. When a particular application requests creation of a new cryptographic key, the particular application sends the request to an HSM cluster client running on the host computer system of the particular application. The HSM cluster client selects a particular HSM in the HSM cluster and sends a key-generation request to the particular HSM via a corresponding HSM cluster server. The HSM generates a new cryptographic key and a new cryptographic-key identifier to identify the new cryptographic key. The new cryptographic key is encrypted using the cluster key and returned with the new cryptographic-key identifier to the HSM cluster client by the HSM cluster server. The HSM cluster client sends the encrypted new cryptographic key to the remaining HSMs in the HSM cluster via the HSM cluster servers. The remaining HSMs decrypt the encrypted new cryptographic key and store the new cryptographic key in association with the new cryptographic-key identifier. The HSM cluster server indicates to the application that the creation of the new cryptographic key is successful if the new key is successfully created and replicated to at least a threshold number of HSMs. In some examples, the threshold number of HSMs is the number of HSMs in the HSM cluster. In another example, the threshold number of HSMs is a percentage of HSMs in the cluster. In some implementations, if the new key is successfully created and replicated to less than the total number of HSMs in the HSM cluster, the HSM cluster client indicates, to the HSM cluster servers, that the state of the HSM cluster is no longer synchronized.

When an application submits a request to delete a cryptographic key from the HSM cluster 102, the application submits a request to apply a tombstone to the cryptographic key on each HSM in the HSM cluster 102. A tombstone is a tag, attribute, property, or other indication associated with a cryptographic key that indicates that the cryptographic key has been deleted and may no longer be used. In some examples, the tombstone is applied by sending a tombstone command to each HSM via a corresponding HSM cluster server, and the HSM tags the cryptographic key with the tombstone property. In other examples, the tombstone is applied by overwriting the cryptographic key. The HSM prevents the use of any cryptographic key having the tombstone property, and prevents creation of any new cryptographic key having a cryptographic identifier that matches the tombstoned the cryptographic key. If the application is not able to apply the tombstone to all HSMs in the HSM cluster, the tombstone may be replicated at a later time across the remaining HSMs as part of an HSM-cluster synchronization operation. Once the tombstone is applied and replicated across all HSMs in the HSM cluster and the HSM cluster is in a synchronized state, the tombstones and their associated cryptographic keys are removed from the HSM cluster in an atomic or semi-atomic operation.

State information related to the HSM cluster is maintained by the HSM cluster servers 118, 120, and 122. Each HSM cluster server maintains information that allows the HSM cluster server to communicate with other HSM cluster servers in the HSM cluster, as well as information that describes the synchronization status of the HSM cluster. In some situations, a particular HSM cluster server or group of HSM cluster servers may become separated from the remaining HSM cluster servers, resulting in an HSM-cluster partition. In such situations, the HSM cluster 102 may detect the situation but continue to allow applications and HSM cluster clients to perform cryptographic operations on the HSMs that are reachable, so long as those cryptographic operations do not modify the cryptographic keys. If the HSM cluster servers regain connectivity with each other the HSM cluster client or HSM cluster server may establish a lock on the HSM cluster 102, preventing write operations to the HSMs in the HSM cluster and re-synchronizing the cryptographic keys on all HSMs.

In some implementations, the HSM cluster servers accumulate load-balancing information that is provided to the HSM cluster clients. The HSM cluster clients use the load-balancing information to select a particular HSM on which to perform cryptographic operations and create cryptographic keys. The load-balancing information may include present cryptographic workload, a present backlog of cryptographic operations, a processing capability, or a measure of reliability.

When a new cryptographic key is generated on the HSM cluster 102, the cryptographic key is assigned a new key identifier. The HSM cluster 102 ensures that the new key identifier is unique across the set of HSMs. In some examples, when a new cryptographic key is created, the HSM cluster 102 assigns an HSM-specific prefix to the identifier associated with the new cryptographic key. The prefix is based at least in part on the identity of the HSM that is creating the cryptographic key and is unique to the HSMs within the HSM cluster 102. In some examples, each HSM in the HSM cluster 102 is assigned a unique 8-bit prefix, and the new cryptographic key created by the HSM is identified by a key identifier that begins with the eight-bit prefix of the HSM that created the new cryptographic key. In some implementations, individual HSMs are assigned a non-overlapping range of prefixes such as an alphabetical or numerical range, and each individual HSM selects prefixes for new cryptographic keys from an associated assigned non-overlapping range of prefixes.

Figure 2:
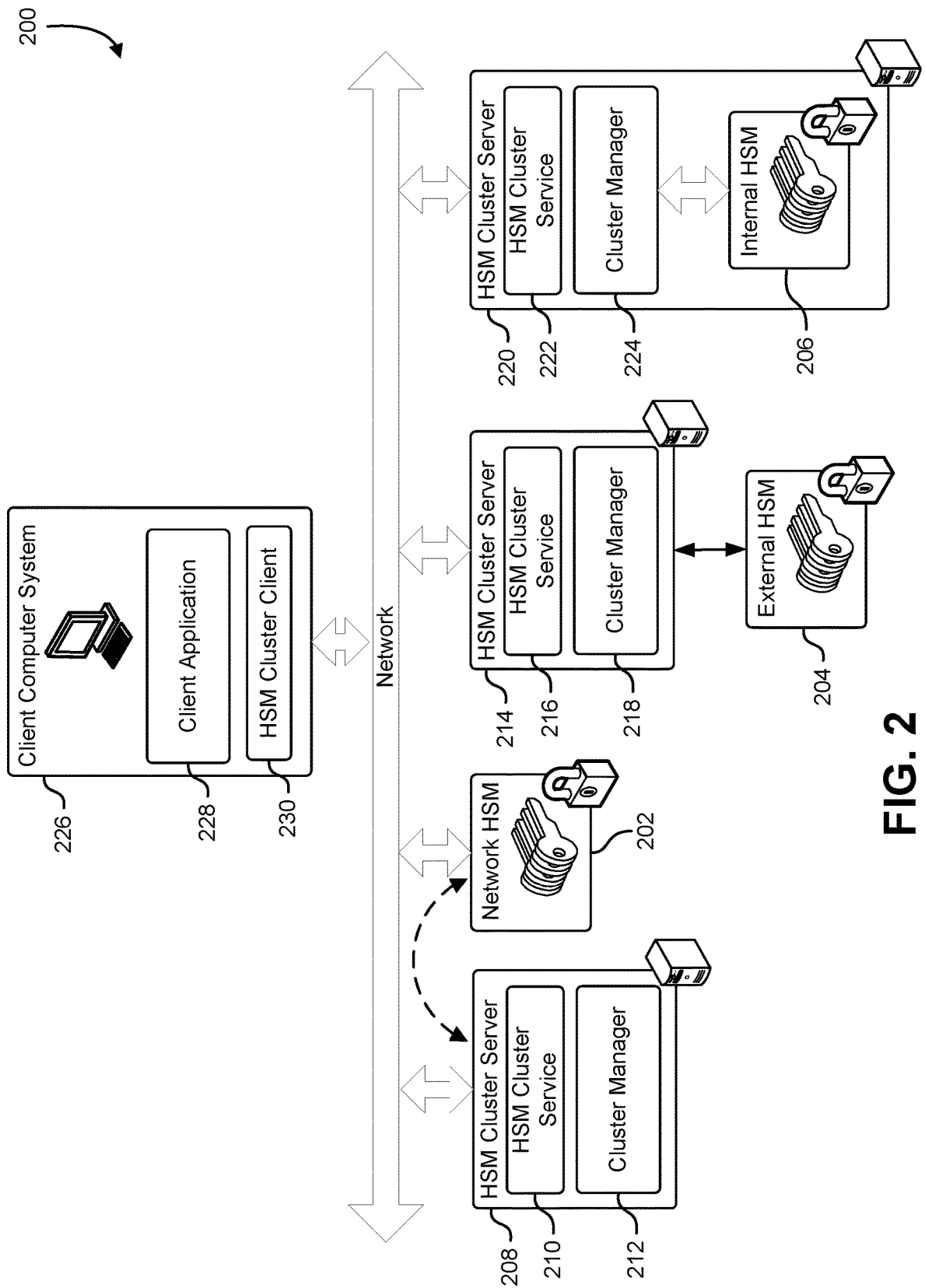
FIG. 2 shows an illustrative example of an HSM cluster that provides cryptographic services to a client computer system.

FIG. 2 shows an illustrative example of an HSM cluster that provides cryptographic services to a client computer system. A system 200 illustrates an HSM cluster that includes a network HSM 202, an external HSM 204, and an internal HSM 206. The network HSM 202 is connected to a computer network. A first HSM cluster server 208 communicates with the network HSM 202 via the computer network, and manages the operation of the network HSM 202 within the HSM cluster. The HSM cluster server 208 is a computer system, compute server, a virtual computer system or server cluster that hosts a number of services that support the operation of the HSM cluster. The services are implemented using instructions written on computer readable media and executed by a processor on the HSM cluster server 208. The first HSM cluster server 208 includes an HSM cluster service 210 and a cluster manager 212. The HSM cluster service 210 communicates with HSM cluster clients running on host computer systems with client applications. The HSM cluster service 210 receives cryptographic requests from applications via HSM cluster clients, and relays the cryptographic requests to the network HSM 202. The cryptographic requests may be requests to create a new cryptographic key, requests to store a new cryptographic key, requests to delete a cryptographic key, requests to modify a particular cryptographic key, or requests to perform a cryptographic operation using a cryptographic key stored on the network HSM 202. The cluster manager 212 attempts to maintain communication with the other HSM cluster servers in the HSM cluster. The cluster manager 212 monitors the synchronization state of the HSM cluster, coordinates the addition and removal of the HSMs to and from the HSM cluster, and in some implementations, assists in synchronizing the cryptographic keys maintained on the HSM cluster.

A second HSM cluster server 214 manages interactions with the external HSM 204. The external HSM 204 may be connected to the second HSM cluster server 214 via a USB interface, FireWire interface, a serial interface, a fiber-optic interface, or other external interface. The second HSM cluster server includes an HSM cluster service 216 and a cluster manager 218. The HSM cluster service 216 relays cryptographic requests to the external HSM 204, and the cluster manager 218 performs cluster-management operations in coordination with the other HSM cluster servers in the HSM cluster.

A third HSM cluster server 220 manages interactions with the internal HSM 206. The third HSM cluster server 220 may be a computer server, rack-mounted computer system, or personal computer system, and the internal HSM 206 may be a PCI card, PC card, or other internally-mounted device installed in the third HSM cluster server 220. The third HSM cluster server 220 includes an HSM cluster service 222 and a cluster manager 224. The HSM cluster service 222 relays cryptographic requests to and from the internal HSM 206, and the cluster manager 224 performs cluster-management operations in coordination with the other HSM cluster servers in the HSM cluster.

A client computer system 226 is connected to the network and hosts a client application 228 and an HSM cluster client 230. The client computer system 226 may be a personal computer system, a computer server, a handheld device, a tablet computer, a laptop computer, a cellular phone, a network appliance, or other network-connected device. The client application 228 is an application program running on the client computer system 226. The client application 228 accesses the HSM cluster client 230 via an API provided by the HSM cluster client 230. The client application 228 submits cryptographic requests such as key creation requests, key deletion requests, encryption requests and decryption requests, to the HSM cluster. The HSM cluster client 230 selects a particular HSM from the HSMs in the HSM cluster and dispatches the cryptographic request to the selected HSM via an associated HSM cluster server. For example, if the HSM cluster client 230 selects the external HSM to fulfill the cryptographic request, the HSM cluster client 230 sends the request to the HSM cluster server 214 where it is received by the HSM cluster service 216. The HSM cluster service 216 forwards the cryptographic request to the external HSM 204. The external HSM 204 fulfills the cryptographic requests and returns the results to the HSM cluster service 216. The HSM cluster service 216 relays a result to the HSM cluster client 230 which returns the results to the client application 228. The HSM cluster client 230 may select a particular HSM from the HSMs in the HSM cluster based at least in part on the performance characteristics of individual HSMs in the HSM cluster, performance history of the individual HSMs, past reliability of the individual HSMs, or preference is configured by an administrator or client application.

When a particular HSM cluster client such as the HSM cluster client 230 performs a key addition or key deletion operation on the HSM cluster, the HSM cluster client attempts to distribute the operation to all HSMs in the HSM cluster. If the HSM cluster client 230 is unsuccessful in distributing the operation to all HSMs in the HSM cluster, the HSM cluster may enter an unsynchronized state where different HSMs in the HSM cluster contain different sets of cryptographic keys.

The cluster managers of the HSM cluster monitor the synchronization state of the HSMs and flag when the HSM cluster becomes unsynchronized. The cluster managers may periodically check the synchronization state of the cluster or may check the synchronization state in response to input from HSM cluster clients. For example, if during generation of a new cryptographic key, an HSM cluster client is unable to confirm that a cryptographic key has been replicated across the HSM cluster, the HSM cluster client may notify a corresponding HSM cluster server that the state of the HSM cluster is not synchronized. The notification causes the HSM cluster server to check the synchronization of the HSM cluster. Each HSM cluster manager in the HSM cluster contacts an associated HSM and requests a hash of the HSM contents. The HSMs generate a hash value of their respective contents and return the hash values to their associated HSM cluster servers. The HSM cluster servers compare the returned hash values, and if the hash values returned by the HSMs do not match, the HSM cluster is determined to be in an unsynchronized state. The unsynchronized state may be reported to HSM cluster clients. In some implementations, the HSM cluster servers periodically acquire a cryptographic hash of the cryptographic keys in their associated HSMs and broadcast the cryptographic hash to other HSM cluster servers in the HSM cluster. The other HSM cluster servers compare the received cryptographic hash to the cryptographic hash computed for their own respective HSMs to confirm that the HSM cluster is synchronized.

If the HSM cluster enters an unsynchronized state, an HSM cluster client running on a client computer system may perform a resynchronization operation to restore the HSM cluster to a synchronized state. In the example shown in FIG. 2, if the HSM cluster client 230 detects that the HSM cluster is not synchronized, the HSM cluster client 230 attempts to establish a lock over the HSM cluster. To establish the lock, the HSM cluster client 230 indicates to the HSM cluster servers that a resynchronization operation is going to be attempted by the HSM cluster client 230, and the HSM cluster servers prevent other HSM cluster clients from modifying the cryptographic keys maintained by the HSM cluster. The lock may be established across all HSM cluster servers in the HSM cluster using any number of semaphore structures or algorithms used for coordinating access to shared resources in a multiprocessing environment. Once the lock is established, the HSM cluster client sends a request to each HSM cluster server to retrieve encrypted versions of each key in each HSM in the HSM cluster. The HSM cluster client merges the encrypted versions of each key into a merged set of cryptographic keys to be replicated across the HSM cluster. In some implementations, the HSM cluster client sends the merged set of cryptographic keys to all HSMs in the HSM cluster, and the HSMs load the merged set of cryptographic keys into protected memory to resynchronize the HSM cluster. In another implementation, the HSM cluster client identifies particular cryptographic keys that are absent from each HSM and sends the particular cryptographic keys that are absent from each HSM to each HSM to resynchronize the HSM cluster.

Figure 3:
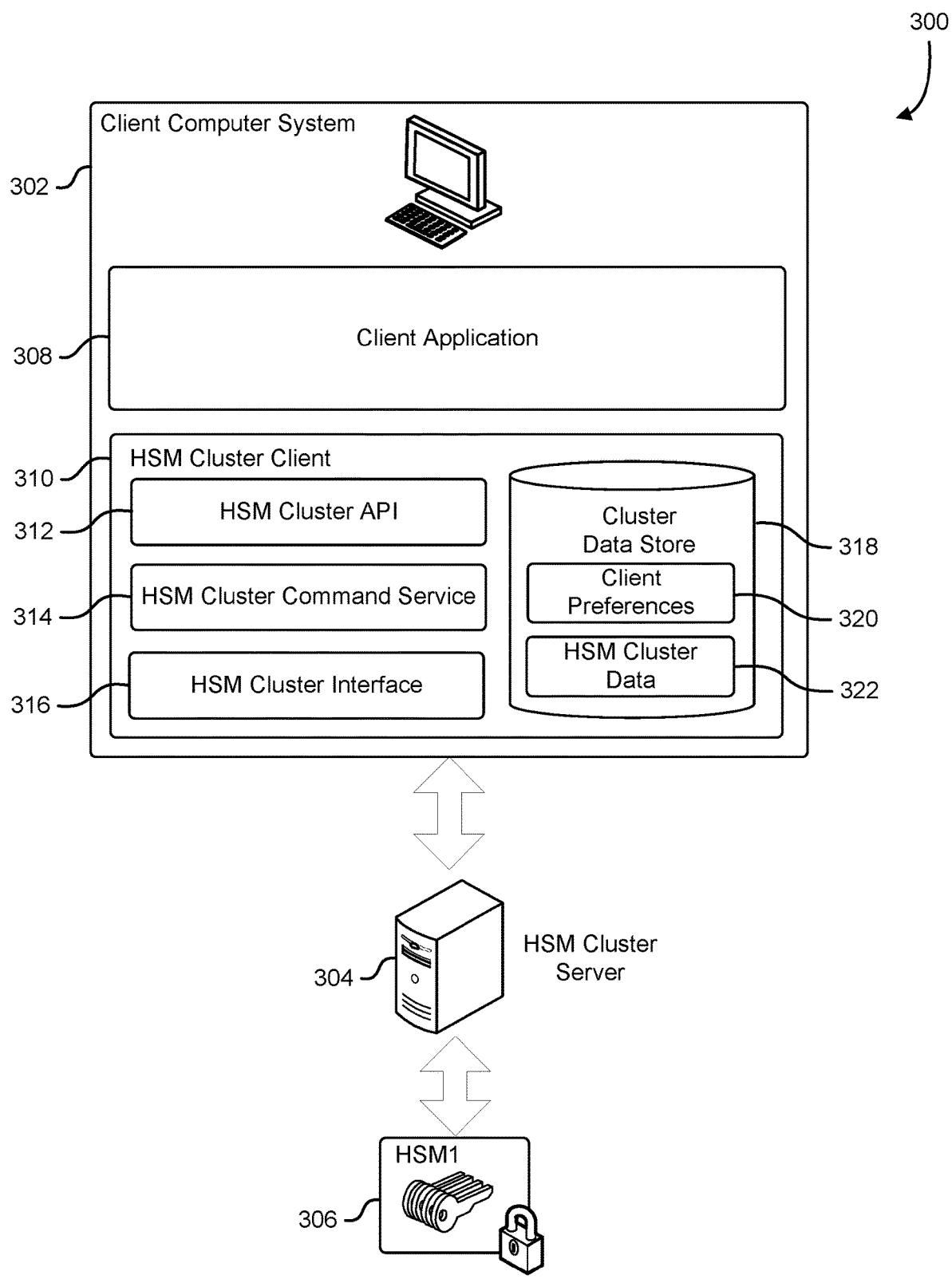
FIG. 3 shows an illustrative example of an application hosted by a client computer system that uses an HSM cluster client to perform cryptographic operations on an HSM cluster.

FIG. 3 shows an illustrative example of an application hosted by a client computer system that uses an HSM cluster client to perform cryptographic operations on an HSM cluster. A block diagram 300 illustrates a client computer system 302 that interacts with an HSM cluster comprised of an HSM cluster server 304 and an HSM 306. The client computer system 302 may be a personal computer, computer server, network appliance, or other device that utilizes cryptographic resources provided by the HSM cluster. The HSM cluster may include additional HSM cluster servers in addition to the HSM cluster server 304 and additional HSMs other than the HSM 306. The client computer system 302 hosts a client application 308. The client application utilizes cryptographic services provided by the HSM cluster. The client application 308 accesses the HSM cluster using an HSM cluster client 310. The HSM cluster client 310 is a software service hosted by the client computer system 302. The HSM cluster client includes an HSM cluster API 312, an HSM cluster command service 314, an HSM cluster interface 316, and the cluster data store 318.

The HSM cluster API 312 is an application programming interface that is accessible to the client application 308. Using the HSM cluster API 312, the client application 308 may submit key-generation requests, key-deletion requests, key-modification requests, and key-use requests, to the HSM cluster. The requests are received by the HSM cluster API 312 and passed to the HSM cluster command service 314. The HSM cluster command service 314 uses client preferences 320 and HSM cluster data 322 to identify a target HSM for each request and, if necessary, the HSM cluster command service 314 replicates particular requests across multiple HSMs in the HSM cluster to preserve HSM-cluster synchronization.

For example, if the client application 308 submits a request to generate a cryptographic key, the request is received by the HSM cluster API 312 and forwarded to the HSM cluster command service 314. The HSM cluster command service 314 identifies a particular HSM for creating the new cryptographic key based at least in part on the client preferences 320 and the HSM cluster data 322. The key-generation request is sent to the selected HSM by an associated HSM cluster server, and the HSM cluster command service 314 receives an encoded version of the new cryptographic key and an associated identifier from the selected HSM. The HSM cluster command service 314 sends the encoded new cryptographic key and the associated identifier to the remaining HSMs in the HSM cluster.

Communication with the HSM cluster server 304 is facilitated by the HSM cluster interface 316. The HSM cluster interface 316 may be a network driver, shared memory driver, Fiber Channel driver, or other communication interface that allows the HSM cluster client 310 to communicate with the HSM cluster server 304. In some implementations, the HSM cluster interface 316 is a network driver that implements a cryptographically protected communication session with the HSM cluster server 304, and the client computer system 302 and the HSM cluster server 304 communicate via a computer network.

The cluster data store 318 is a local data store that maintains information related to the HSM cluster. The client preferences 320 may include preferences configured by an operator of the client computer system to help select a particular HSM from the set of HSMs in the HSM cluster. In various examples, the client preferences 320 may identify a list of preferred HSMs in the HSM cluster. The HSM cluster data 322 includes information that describes the HSMs and the HSM cluster servers that comprise the HSM cluster. The HSM cluster data 322 includes a list of the HSM cluster servers as well as information. The HSM cluster data 322 includes information describing the HSMs in the HSM cluster and identifies the HSM cluster server that may be used to communicate with each HSM.

In some implementations, the HSM cluster client 310 relays information describing the state of the HSM cluster to the client application 308. In some examples, the HSM cluster client 310 provides an API that describes whether the HSM cluster is synchronized, unsynchronized, or locked. In additional examples, the HSM cluster client 310 provides an API that describes the number of HSMs in the HSM cluster, the number of HSM cluster servers in the HSM cluster, and the properties of the HSMs in the HSM cluster. In yet another implementation, the HSM cluster client 310 provides the above information to the client application 308 with the results of a cryptographic operation requested by the client application 308.

In many implementations, when performing a non-atomic operation such as a key, generation or key deletion operation, the HSM cluster client 310 will attempt to contact all HSMs in the HSM cluster. If the HSM cluster client 310 is unable to contact all HSMs in the HSM cluster, the non-atomic operation will not fail, but the HSM cluster may be left in an unsynchronized state. When performing an atomic operation such as modifying properties of a cryptographic key or clearing deleted key tombstones, the HSM cluster client 310 will attempt to contact all HSMs in the HSM cluster. If the HSM cluster client 310 is unable to contact all HSMs in the HSM cluster, the atomic operation will fail. If the operation fails, the HSM cluster client 310 will attempt to back-out the operation. If backing-out the operation fails, the HSM cluster client 310 will signal an administrator to assist in re-synchronizing the HSM cluster.

In some implementations, a customer may choose to allow all HSM cluster clients to perform key creation and deletion operations even when individual HSM cluster clients are not able to contact all HSMs in the HSM cluster. In such implementations, the HSM cluster operates in an unsynchronized state and relies on periodic resynchronization operations performed by a designated client computer system that is able to access all the HSMS in the HSM cluster. Some HSM cluster clients may be configured to allow only cryptographic operations that do not modify the cryptographic keys maintained on the HSM cluster. In such implementations, a designated HSM cluster client may be configured to perform cryptographic operations that modify the content of the HSMs in the HSM cluster, and the remaining HSM cluster clients are configured to perform only cryptographic operations that do not modify the content of the HSMs.

Figure 4:
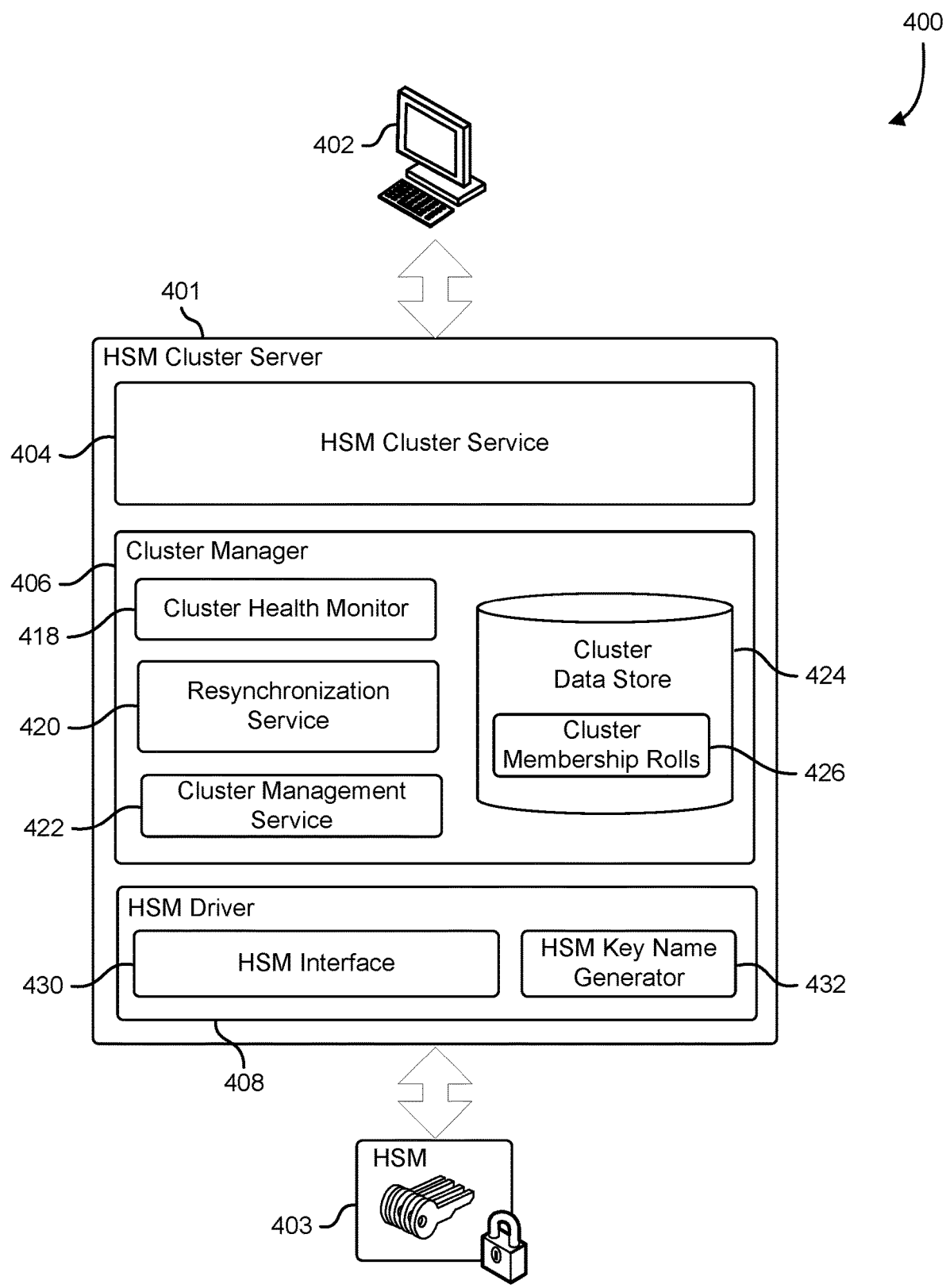
FIG. 4 shows an illustrative example of an HSM cluster server that manages an HSM that is a member of an HSM cluster.

FIG. 4 shows an illustrative example of an HSM cluster server that manages an HSM that is a member of an HSM cluster. A block diagram 400 shows an HSM cluster server 401 that acts as an interface between an application running on a client computer system 402 and an HSM 403. The client computer system 402 is a personal computer system, computer server, or other computing device that hosts an application program. The application program accesses an HSM cluster client via an API on the client computer system 402. The HSM cluster client communicates via a computer network with the HSM cluster server 401. The HSM cluster server is a personal computer, server computer, computer appliance, virtual computer system, or other computing device that communicates with the HSM 403. In some examples, the HSM cluster server 401 is a server computer system, and the HSM 403 is an expansion card installed in the server computer system. The HSM cluster server 401 includes a network interface that is used to communicate with the client computer system 402.

The HSM cluster server 401 includes an HSM cluster service 404, a cluster manager 406, and an HSM driver 408. The HSM cluster service 404, the cluster manager 406, and the HSM driver 408 are components of the HSM cluster server 401 that are implemented by executing instructions stored on a computer readable memory using a processor in the HSM cluster server 401. The HSM cluster service 404 receives and processes requests to perform cryptographic operations from HSM cluster clients.

The HSM cluster service 404 processes the request using the HSM 403. The HSM cluster service 404 sends instructions to the HSM 403 via the HSM driver 408. In some examples, the HSM driver 408 sends instructions to the HSM 403 via a PCI backplane associated with the HSM cluster server 401. In another example, the HSM driver 408 sends instructions to the HSM 403 via a USB interface. In yet another example, the HSM driver 408 is a network driver that sends the instructions to the HSM 403 via a computer network.

The cluster manager 406 performs operations that coordinate the management of the HSM cluster. The cluster manager 406 includes a cluster health monitor 418, a resynchronization service 420, the cluster management service 422, and the cluster data store 424. The cluster data store 424 holds cluster membership rolls 426. The cluster health monitor 418 monitors the HSMs within the HSM cluster and determines whether the HSM cluster is in a synchronized or an unsynchronized state. In some implementations, the cluster health monitor 418 periodically contacts the other HSM cluster servers in the HSM cluster and requests information that describes the contents of the HSMs managed by the other HSM cluster servers. The information may include a hash or checksum of the contents of each HSM. In some examples, the information is a cryptographic hash of the contents of each HSM in the HSM cluster. The cluster health monitor 418 compares the cryptographic hashes of each HSM. If the cryptographic hashes match each other, the HSM cluster is determined to be in a synchronized state. If the cryptographic hashes of two HSMs in the HSM cluster do not match, the cluster health monitor 418 determines that the contents of the two HSMs do not match, and therefore, the HSM cluster is not in a synchronized state.

When the cluster health monitor 418 determines that the HSM cluster is not in a synchronized state, the cluster health monitor 418 records the state of the HSM cluster, and may report the state of the HSM cluster to the other HSM cluster servers, as well as the HSM cluster clients. In some examples, individual HSM cluster clients may take actions to resynchronize the HSM cluster. In other examples, the cluster manager 406 includes a resynchronization service 420, and the resynchronization service 420 performs actions to resynchronize the information in the HSMs across the HSM cluster.

In various examples, the resynchronization service performs operations assist in the resynchronization of the HSMs in the HSM cluster. Periodically, or in response to a signal received from a HSM cluster client, the HSM cluster server will attempt to determine whether the HSM is in synchronization with other HSMs in the cluster. In order to determine whether an HSM is synchronized, the resynchronization service 420 queries the HSM to obtain a checksum, a hash value, or other indication that securely describes the contents of the HSM without revealing the HSMs contents in plaintext form. The checksum, a hash value, or other indication is compared to corresponding indications acquired by other HSM cluster servers associated with other HSMs in the cluster and, if non-matching indications are discovered, the HSM cluster server flags the HSM as being in an unsynchronized state. In some examples, the newly determined indication is broadcast over a computer network to other HSM cluster servers. In other examples, the indication is sent individually to the various HSM cluster servers in the HSM cluster. When an HSM cluster server receives a checksum, a hash value, or other indication of the contents of an another HSM, the HSM cluster server compares the received indication to a corresponding indication generated by the HSM cluster server's HSM. If the indications match, the HSMs are determined to be in sync. If the indications do not match, the HSMs are determined to be unsynchronized. If any HSM cluster server in the HSM cluster determines that at least one HSM is in an unsynchronized state, the HSM cluster server alerts the other HSM cluster servers in the HSM cluster that the HSMs are in an unsynchronized state. To restore the HSM cluster to a synchronized state the HSM cluster servers may assist an HSM cluster client in acquiring a write lock. In some examples, the HSM cluster server receives a request for a write lock from an HSM cluster client. The resynchronization service 420 contacts the other HSM cluster servers in the HSM cluster and establishes a write-lock that prevents other entities from adding or modifying cryptographic keys retained in the HSM cluster. If the HSM cluster client is able to establish the write-lock, the HSM cluster client is able to perform operations that restore resynchronization to the HSM cluster.

The HSM cluster client can reestablish synchronization across the HSM cluster in the number of ways. In some examples, the HSM cluster client acquires encrypted versions of each cryptographic key that are encrypted using a cryptographic key shared between the HSMs in the HSM cluster but not available outside the HSMs. The HSM cluster client merges the encrypted versions of the cryptographic keys to create a complete set of encrypted cryptographic keys to be replicated across the HSM cluster. In some implementations, the HSM cluster client distributes the complete set of encrypted cryptographic keys to each HSM in the HSM cluster, and each HSM in the HSM cluster decrypts and stores the encrypted cryptographic keys. In other examples, the HSM cluster client identifies particular encrypted cryptographic keys that are missing from each HSM in the HSM cluster, and sends the missing cryptographic keys particular to each HSM in the HSM cluster to each HSM. Each HSM decrypts the received encrypted cryptographic keys and adds the cryptographic keys to the HSM. After the synchronization of the HSM cluster is reestablished, the resynchronization service 420 contacts the other HSM cluster servers and releases the write-lock on the HSM cluster.

The cluster management service 422 provides an interface for managing the HSMs and the HSM cluster servers in the HSM cluster. The cluster management service 422 is able to add or remove HSMs, and add or remove HSM cluster servers, to or from the HSM cluster. In some implementations, an administrator contacts the cluster management service 422 using a management console and is able to modify the cluster membership rolls 426 in the cluster data store 424. The cluster membership rolls 426 describe the collection of HSM cluster servers and associated HSMs in the HSM cluster. In some examples, when the administrator modifies the cluster membership rolls 426, the cluster management service 422 contacts the existing HSM cluster servers and sends an update that modifies the other cluster membership rolls on the other HSM cluster servers in accordance with the modifications performed by the administrator on the cluster membership rolls 426.

The HSM driver 408 contains an HSM interface 430 and an HSM key name generator 432. The HSM driver 408 may be a network driver, a USB driver, FireWire driver, serial port driver, a PCI driver, PC card driver, or other interface driver. In some implementations, the HSM cluster server 401 includes a number of HSM drivers that communicate with a corresponding number of HSMs. The HSM interface 430 relays communications from the components of the HSM cluster server to the HSM 403. The HSM key name generator 432 generates an identifier, prefix, or identifier range that is unique to the HSM cluster and associated with the HSM 403. In some examples, the HSM key name generator generates an alphanumeric or numeric prefix that is unique to the HSM cluster. In other examples, the HSM key name generator generates a numeric or alphanumeric range of key identifiers that may be used by the HSM 403 when creating new cryptographic keys.

Figure 5:
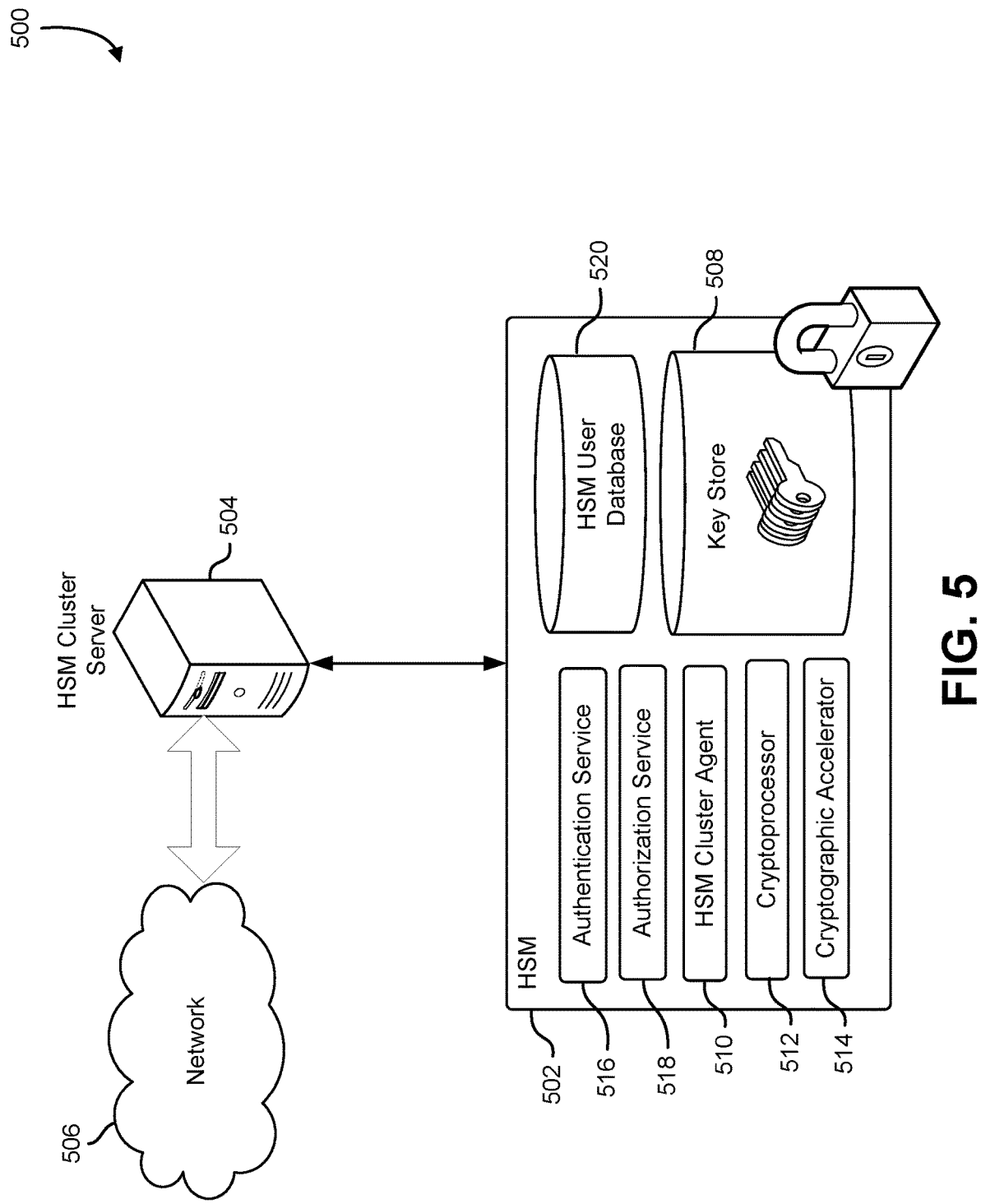
FIG. 5 shows an illustrative example of an HSM that is a member of an HSM cluster.

FIG. 5 shows an illustrative example of an HSM that is a member of an HSM cluster. A block diagram 500 illustrates a structure of an HSM 502 within the HSM cluster. The HSM 502 is managed by an HSM cluster server 504. The HSM cluster server is able to receive cryptographic requests from applications via a computer network 506. The HSM 502 retains cryptographic keys in a key store 508. The key store 508 maintains the cryptographic keys in non-exportable protected storage. The HSM 502 includes an HSM cluster agent 510, a cryptoprocessor 512, a cryptographic accelerator 514, an authentication service 516, and an authorization service 518. At the request of the HSM cluster server 504, the crypto processor 512 performs cryptographic operations using the cryptographic keys maintained in the key store 508. In some HSMs, an optional cryptographic accelerator may be present. The cryptographic accelerator 514 is a coprocessor designed to accelerate computationally intensive cryptographic operations. Applications may submit requests to perform complex cryptographic operations to the HSM 502, and the cryptographic accelerator 514 may perform the complex cryptographic operation on behalf of the application.

The HSM 502 uses the authentication service 516 to verify the identity of the requester using information retained in an HSM user database 520. The identity of the requester may be verified in part by using information that identifies the computer system that hosts the application such as network address information or digital certificate associated with the computer system. In some examples, credentials are provided by the application to verify the identity of the requester. Using the verified identity of the requester, the authorization service 518 determines whether the requested cryptographic operation is authorized. The HSM user database 520 may include information that limits the types of cryptographic operations particular requesters may perform. Authorization may be based at least in part on the type of cryptographic operation requested or on the particular cryptographic key used to perform the requested operation.

The key store 508 includes a cluster key that is stored on each of the HSMs in the HSM cluster but is not available outside the HSMs. The cluster key is used to exchange encrypted versions of the cryptographic keys between HSMs within the HSM cluster. The HSM cluster agent 510 performs a number of functions to monitor and repair the synchronization of the HSM cluster. To monitor the synchronization of the HSM cluster, the HSM cluster agent 510 generates a cryptographic hash of the information in the key store 508 and provides the cryptographic hash to the HSM cluster server. The HSM cluster server 504 is able to compare the cryptographic hash provided by the HSM cluster agent 510 to corresponding cryptographic hashes provided by other HSMs in the HSM cluster to determine whether the HSM cluster is synchronized. If the HSM cluster enters an unsynchronized state, the HSM cluster server 504, either by itself or at the request of an HSM cluster client, requests encrypted versions of the keys in the key store 508. The cluster agent 510 uses the cluster key to encrypt each cryptographic key in the key store 508 and provides the identifier of each cryptographic key in association with the encrypted version of each cryptographic key to the HSM cluster server 504. Using this information, the HSM cluster server 504 may identify cryptographic keys that are missing from various HSMs in the HSM cluster and restore synchronization to the HSM cluster by distributing the appropriate keys that are missing to the appropriate HSMs.

Figure 6:
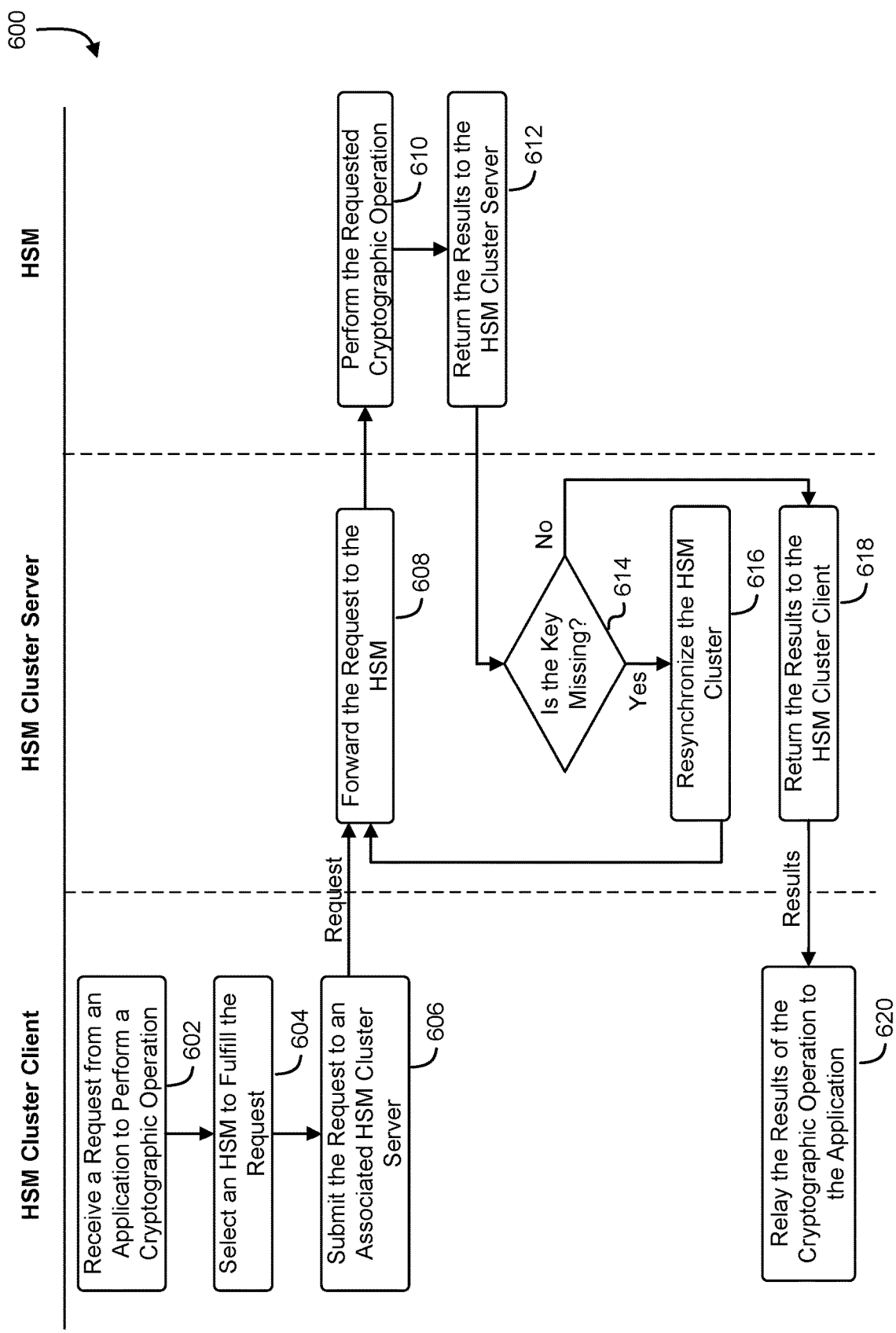
FIG. 6 shows an illustrative example of a process that, as a result of being performed by an HSM cluster client, an HSM cluster server, and an HSM, fulfills a request to perform a cryptographic operation using a cryptographic key maintained by an HSM cluster.

FIG. 6 shows an illustrative example of a process that, as a result of being performed by an HSM cluster client, an HSM cluster server, and an HSM, fulfills a request to perform a cryptographic operation using a cryptographic key maintained by an HSM cluster. A swim diagram 600 illustrates a process that begins at block 602 with an HSM cluster client receiving a request from an application to perform a cryptographic operation. The application and the HSM cluster client are hosted on a client computer system, and the application submits the request to the HSM cluster client via an application programming interface exposed by the HSM cluster client. In some examples, the request is a request to encrypt information using a cryptographic key maintained by the HSM cluster. In other examples, the request is a request to decrypt information using a cryptographic key maintained by the HSM cluster. In yet another example, the request is a request to generate a cryptographic signature for a block of provided data. In yet another example, the request is a request to verify a cryptographic signature of a block of provided data.

The HSM cluster client selects 604 a particular HSM in the HSM cluster to process the received request. The particular HSM may be selected based at least in part on the type of request submitted by the application, the current processing loads of the individual HSMs in the HSM cluster, the cryptographic processing capabilities of the individual HSMs in the HSM cluster, or preference information configured by an administrator. In some implementations, the HSM cluster client establishes a preference order of HSMs in the HSM cluster and attempts to submit the request to each HSM in sequence until an HSM is able to successfully fulfill the request. At block 606, the HSM cluster client identifies a particular HSM cluster server associated with the selected HSM and submits the request to the particular HSM cluster server to be relayed to the selected HSM.

At block 608, the HSM cluster server receives the request from the HSM cluster client and forwards the request to the HSM selected by the HSM cluster client. At block 610, the HSM receives the request from the HSM cluster server and performs the cryptographic operations necessary to fulfill the request. In some examples, the HSM produces encrypted or decrypted data using a cryptographic key accessible to the HSM. At block 612, the HSM returns the results of fulfilling the request to the HSM cluster server. If the HSM is unable to fulfill the request, the HSM returns an error to the HSM cluster server. At decision block 614, the HSM cluster server receives the results from the HSM and determines whether the HSM was able to fulfill the request. If the HSM was not able to find the appropriate cryptographic key to fulfill the request, execution advances to block 616 and the HSM cluster server attempts to resynchronize the cryptographic information maintained by the HSM cluster. After the cryptographic information maintained by the HSM cluster has been resynchronized, execution returns to block 608 and the request is resubmitted to the HSM. If the appropriate cryptographic key is not found after resynchronization in the HSM cluster, an error may be returned to the HSM cluster client. If the operation is fulfilled successfully by the HSM, execution advances from decision block 614 to block 618, and the HSM cluster server returns the results of the request to the HSM cluster client.

At block 620, the HSM cluster client receives the results of the request. The HSM cluster client relays the results to the application via the application programming interface. In some implementations, the HSM cluster server returns state information that describes the synchronization state of the HSM cluster, and the HSM cluster client saves the current state of the HSM cluster in the cluster data store maintained on the client computer system.

Figure 7:
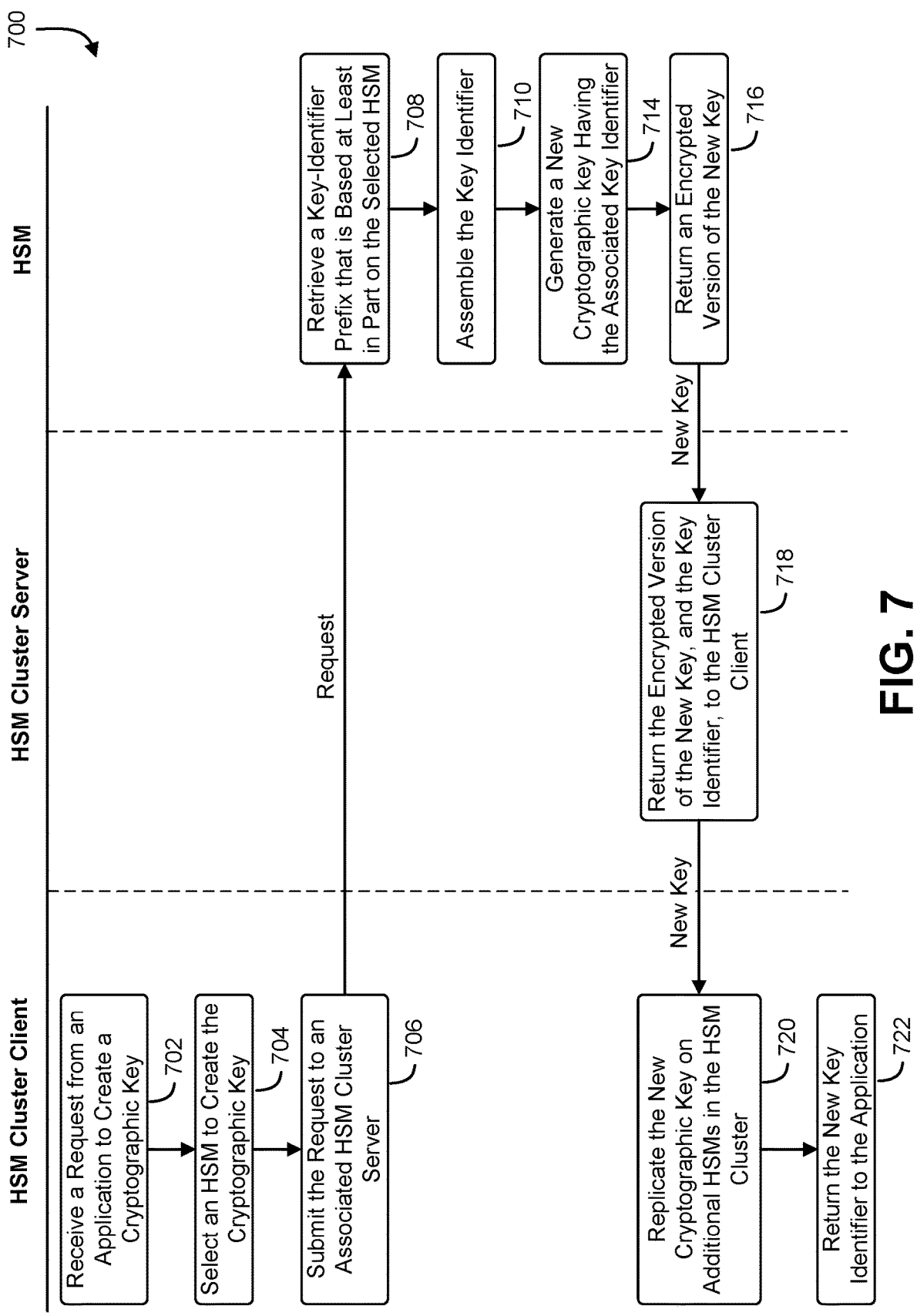
FIG. 7 shows an illustrative example of a process that, as a result of being performed by an HSM cluster client, an HSM cluster server, and an HSM, creates and replicates a new cryptographic key across an HSM cluster.

FIG. 7 shows an illustrative example of a process that, as a result of being performed by an HSM cluster client, an HSM cluster server, and an HSM, creates and replicates a new cryptographic key across an HSM cluster. A swim diagram 700 illustrates a process that begins at block 702 with an HSM cluster client receiving from an application a request to create a new cryptographic key on the HSM cluster. The application and the HSM cluster client are hosted on a client computer system, and the application submits the request to the HSM cluster client via an application programming interface exposed by the HSM cluster client. The request to create a new key may include information that specifies a particular type of cryptographic key and identifying information to be associated with the new cryptographic key. At block 704, the HSM cluster client selects a particular HSM to fulfill the request. The particular HSM may be selected based at least in part on the type of request submitted by the application, the current processing loads of the individual HSMs in the HSM cluster, the cryptographic processing capabilities of the individual HSMs in the HSM cluster, or preference information configured by an administrator. In some implementations, the HSM cluster client establishes a preference order of HSMs in the HSM cluster and attempts to submit the request to each HSM in sequence until an HSM is able to successfully fulfill the request. At block 706, the HSM cluster client identifies a particular HSM cluster server associated with the selected HSM and submits the request to the particular HSM cluster server to be relayed to the selected HSM.

At block 708, the HSM receives the request from the HSM cluster client and acquires a key-identifier prefix for the new cryptographic key. The key-identifier prefix is based at least in part on the identity of the selected HSM. In some examples, the key-identifier prefix is a numeric or alphanumeric sequence that is unique to the selected HSM within the HSM cluster. In another example, the key-identifier prefix is a numeric or alphanumeric range that is non-overlapping with ranges assigned to other HSMs in the HSM cluster. In some implementations, the key-identifier prefix is generated from a network address or network hardware address associated with the HSM. In another implementation, the key-identifier prefix is a globally unique identifier ("GUID") generated by the HSM. The key-identifier prefix is generated and stored when the HSM is added to the HSM cluster, and once stored, the key-identifier prefix is not changed unless the HSM is removed from the cluster. At block 710, the HSM assembles a key identifier for the new cryptographic key. If the HSM cluster client supplies identifier information with the request, the identifier information is combined with the key-identifier prefix to generate the key identifier. In other examples, the HSM generates an identifier for the new cryptographic key using the key-identifier prefix. In some implementations, the HSM maintains a key-identifier generation seed value that is combined with the key-identifier prefix to generate a key identifier for the new cryptographic key. After generating a new key identifier, the key-identifier generation seed value is incremented.

At block 714, the HSM stores the key identifier and generates a new cryptographic key in accordance with characteristics provided with the request. The new cryptographic key and the key identifier are stored in the HSM. In another implementation, a prefix for new cryptographic keys is provided to the HSM when the HSM is added to the HSM cluster, and the HSM generates the identifier for the new cryptographic key in addition to generating the new cryptographic key. At block 716, the HSM returns an encrypted version of the new cryptographic key, and the key identifier associated with the new cryptographic key, to the HSM cluster server.

At block 718, the HSM cluster server receives the encrypted version of the new cryptographic key and the identifier associated with the new cryptographic key. The encrypted version of the new cryptographic key and the identifier associated with the new cryptographic key is relayed to the HSM cluster client. The HSM cluster client replicates 720 the new cryptographic key on the remaining HSMs in the HSM cluster by sending the encrypted version of the new cryptographic key and the associated identifier, to HSM cluster servers associated with the remaining HSMs. The HSM cluster servers relay the new cryptographic key and the associated identifier to the remaining HSMs, and the remaining HSMs decrypt the new cryptographic key, and store the new cryptographic key in association with the associated identifier. If the HSM cluster client is unable to replicate the new cryptographic key on the remaining HSMs, the HSM cluster client sends a message to the HSM cluster servers that the HSM cluster is not in a synchronized state. In some implementations, replication of the new cryptographic key on the remaining HSMs is performed by the HSM cluster server at block 718, and the results of the key creation operation and replication are provided to the HSM cluster server at block 720. At block 722, the identifier associated with the new cryptographic key is returned to the application.

Figure 8:
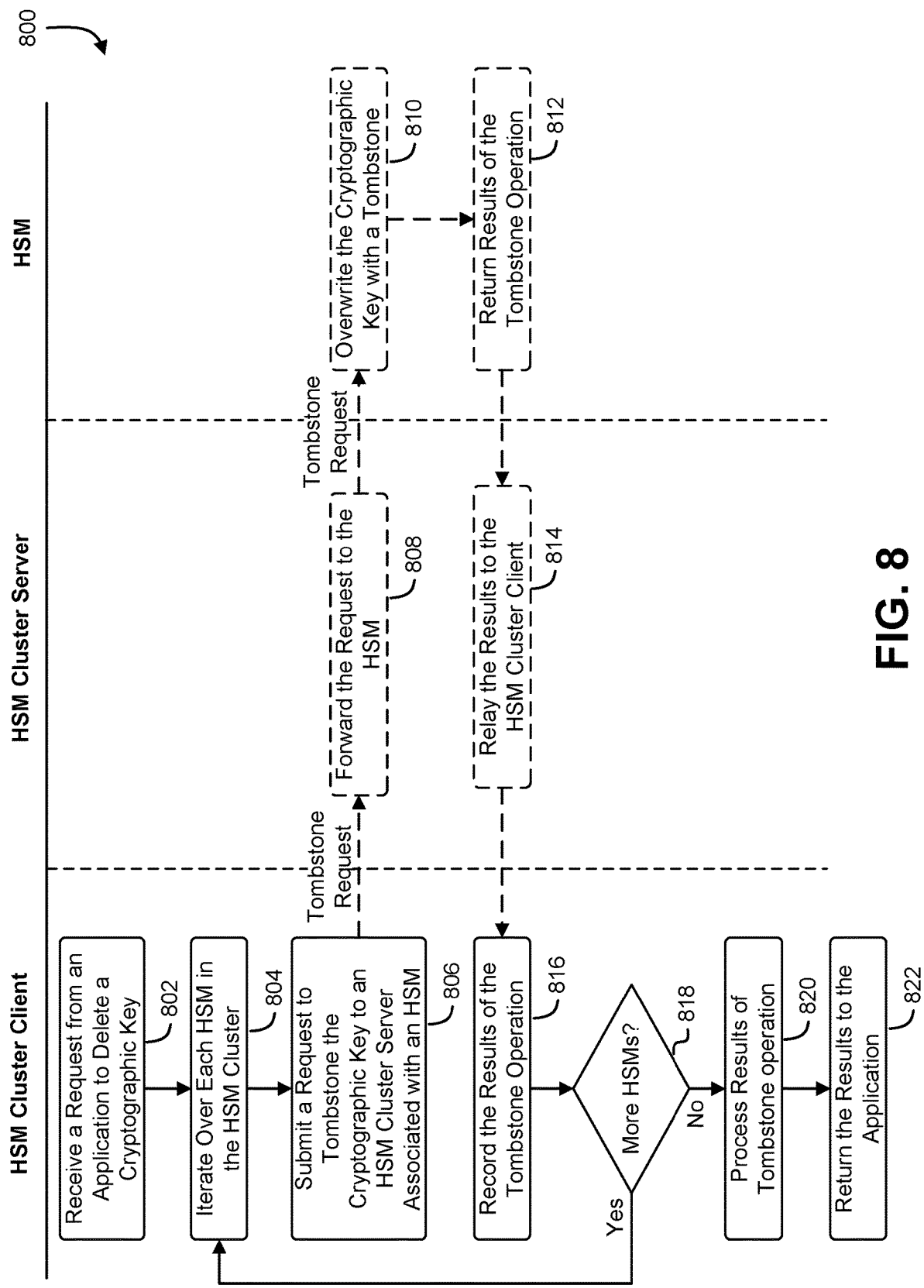
FIG. 8 shows an illustrative example of a process that, as a result of being performed by an HSM cluster client, an HSM cluster server, and an HSM, deletes a cryptographic key maintained on an HSM cluster.

FIG. 8 shows an illustrative example of a process that, as a result of being performed by an HSM cluster client, an HSM cluster server, and an HSM, deletes a cryptographic key maintained on an HSM cluster. A swim diagram 800 illustrates a process that begins at block 802 with an HSM cluster client receiving, from an application, a request to delete a cryptographic key from the HSM cluster. The application and the HSM cluster client are hosted on a client computer system, and the application submits the request to the HSM cluster client via an application programming interface exposed by the HSM cluster client. The request to delete a cryptographic key includes an identifier that is associated with the cryptographic key to be deleted.

The HSM cluster client iterates over each HSM in the HSM cluster and attempts to apply a tombstone to the cryptographic key associated with the provided identifier. At block 804, the HSM cluster client iterates over each HSM in the HSM cluster. At block 806, for each HSM, the HSM cluster client identifies a particular HSM cluster server that manages communication with the HSM, and submits a tombstone request to apply a tombstone to the cryptographic key associated with the identifier to the particular HSM cluster server. The particular HSM cluster server forwards 808 the tombstone request to the HSM. At block 810, the HSM receives the tombstone request, and using the identifier, identifies the cryptographic key to be deleted. A tombstone indication overwrites the cryptographic key. At block 812, the HSM returns the results of the tombstone request to the HSM cluster server, and the HSM cluster server relays 814 the results to the HSM cluster client.

At block 816, the HSM cluster client receives the results of the tombstone operation from the HSM cluster server. At decision block 818, the HSM cluster client determines whether there are more HSMs to be iterated. If there are more HSMs to be processed, execution returns to block 804. Once all HSMs have been processed, execution advances to block 820. At block 820, the HSM cluster client tabulates the results of the tombstone operations. If all HSMs in the HSM cluster successfully apply the tombstone to the cryptographic key associated with the identifier, the deletion operation is committed and the HSM cluster client signals the HSM cluster servers to clear the tombstones. If the HSM cluster is unable to apply a tombstone to any of the HSMs in the HSM cluster, the tombstone operation fails. At block 822, the results of the key-deletion request are returned to the application. If some but not all of the tombstones are able to be applied, the tombstones are replicated across the HSM cluster as part of the synchronization process. During synchronization, tombstones are replicated over any version of a corresponding cryptographic key, and when the HSM cluster is returned to a synchronized state, tombstones may be scrubbed from the HSMs.

Figure 9:
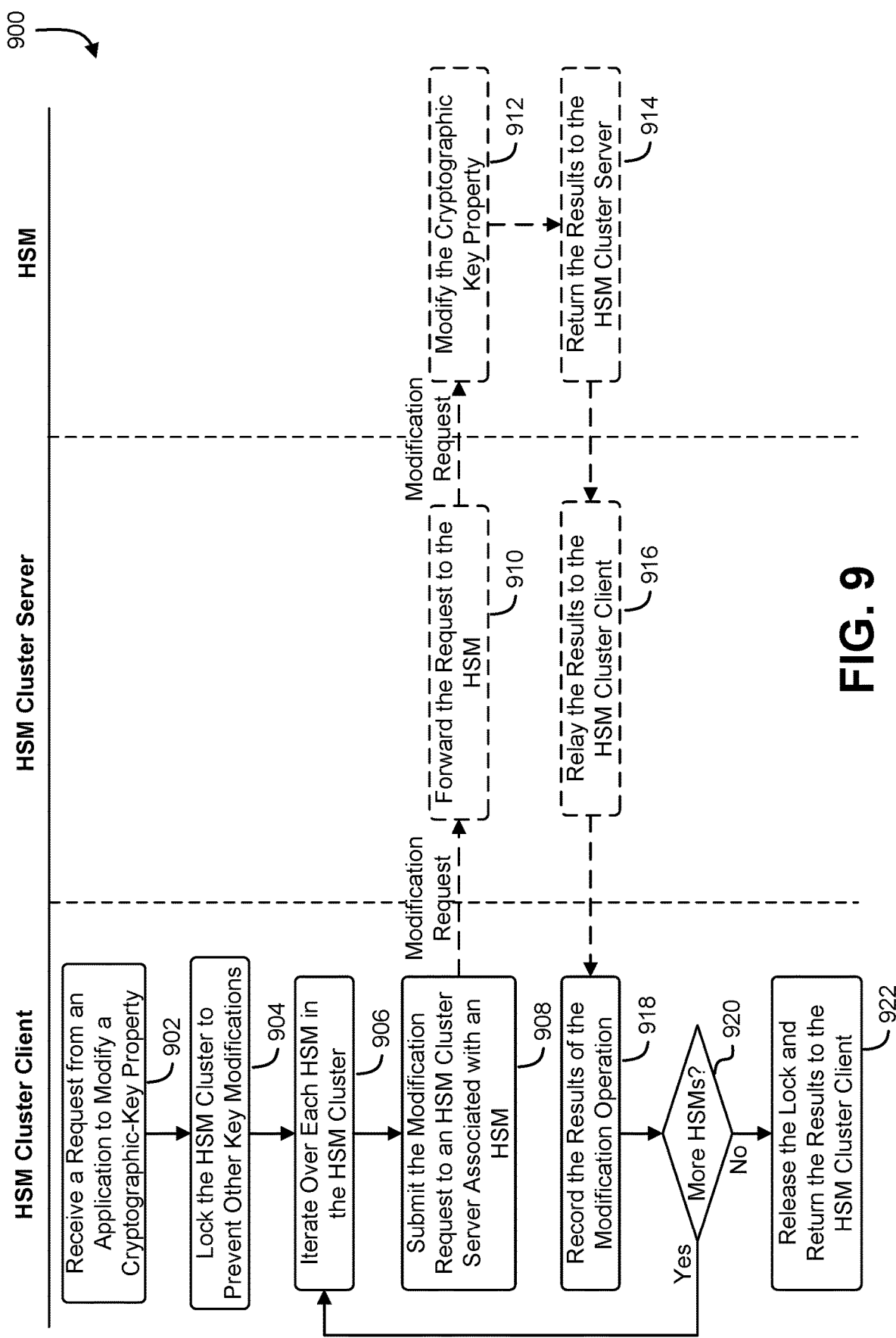
FIG. 9 shows an illustrative example of a process that, as a result of being performed by an HSM cluster client, an HSM cluster server, and an HSM, modifies a property of a cryptographic key maintained on an HSM cluster.

FIG. 9 shows an illustrative example of a process that, as a result of being performed by an HSM cluster client, an HSM cluster server, and an HSM, modifies a property of a cryptographic key maintained on an HSM cluster. A swim diagram 900 illustrates a process that begins at block 902 with an HSM cluster client receiving, from an application, a request to modify a cryptographic key maintained by the HSM cluster. The application and the HSM cluster client are hosted on a client computer system, and the application submits the request to the HSM cluster client via an application programming interface exposed by the HSM cluster client. The request to modify a cryptographic key includes an identifier that is associated with the cryptographic key to be deleted, and one or more cryptographic-key properties that are to be modified. The cryptographic-key properties that are to be modified may be permissions associated with the cryptographic key, and expiration associated with the cryptographic key, an identifier associated with the cryptographic key, or metadata associated with the cryptographic key. At block 904, the HSM cluster client acquires a lock on the HSM cluster that prevents other HSM cluster clients from modifying the same cryptographic key, and also confirms that the HSM cluster is in a synchronized state. In some examples, the HSM cluster client acquires a lock that blocks all changes to cryptographic keys on the HSM cluster. In other implementations, the HSM cluster client only prevents changes to the same cryptographic key that is being modified.

At block 906, the HSM cluster client iterates over each HSM in the HSM cluster and attempts to replicate the modification of the remaining HSMS in the HSM cluster. At block 908, the HSM cluster client submits the modification request to an HSM in the HSM cluster. The HSM cluster server associated with the HSM forwards 910 the modification request to the other HSM. The other HSM receives the request and modifies 912 the cryptographic key in accordance with the request. Results of the modification request are returned 914 from the HSM to the HSM cluster server. The HSM cluster server relays 916 the results to the HSM cluster client. In some implementations, the master HSM encrypts the modified cryptographic key using a cluster key shared across the HSMs in the HSM cluster. The encrypted version of the modified cryptographic key is returned from the HSM to the HSM cluster client, and the HSM cluster client sends the encrypted modified cryptographic key to the remaining HSMs in the HSM cluster to replicate the modification across the HSM cluster.

At block 918, the HSM cluster client receives the results of the modification request from the other HSM and records the results of the modification operation. At decision block 920, the HSM cluster client determines whether there are more HSMs in the HSM cluster to which the modification request is to be replicated. If there are more HSMs in the HSM cluster to which to send the modification request, execution returns to block 906 and the HSM cluster client submits the modification request to another HSM. If there are no more HSMs in the HSM cluster to which the modification request is to be sent, execution proceeds to block 922. At block 922, the HSM cluster client releases the lock on the HSM cluster, and examines the results of the modification request. If the modification request has been replicated across all HSMs in the HSM cluster, the HSM cluster client returns a successful status message to the application. If the modification request has been replicated to at least the master HSM but not all the HSMs in the HSM cluster, the HSM cluster client returns a successful status message to the application and places the HSM cluster in an unsynchronized state.

Figure 10:
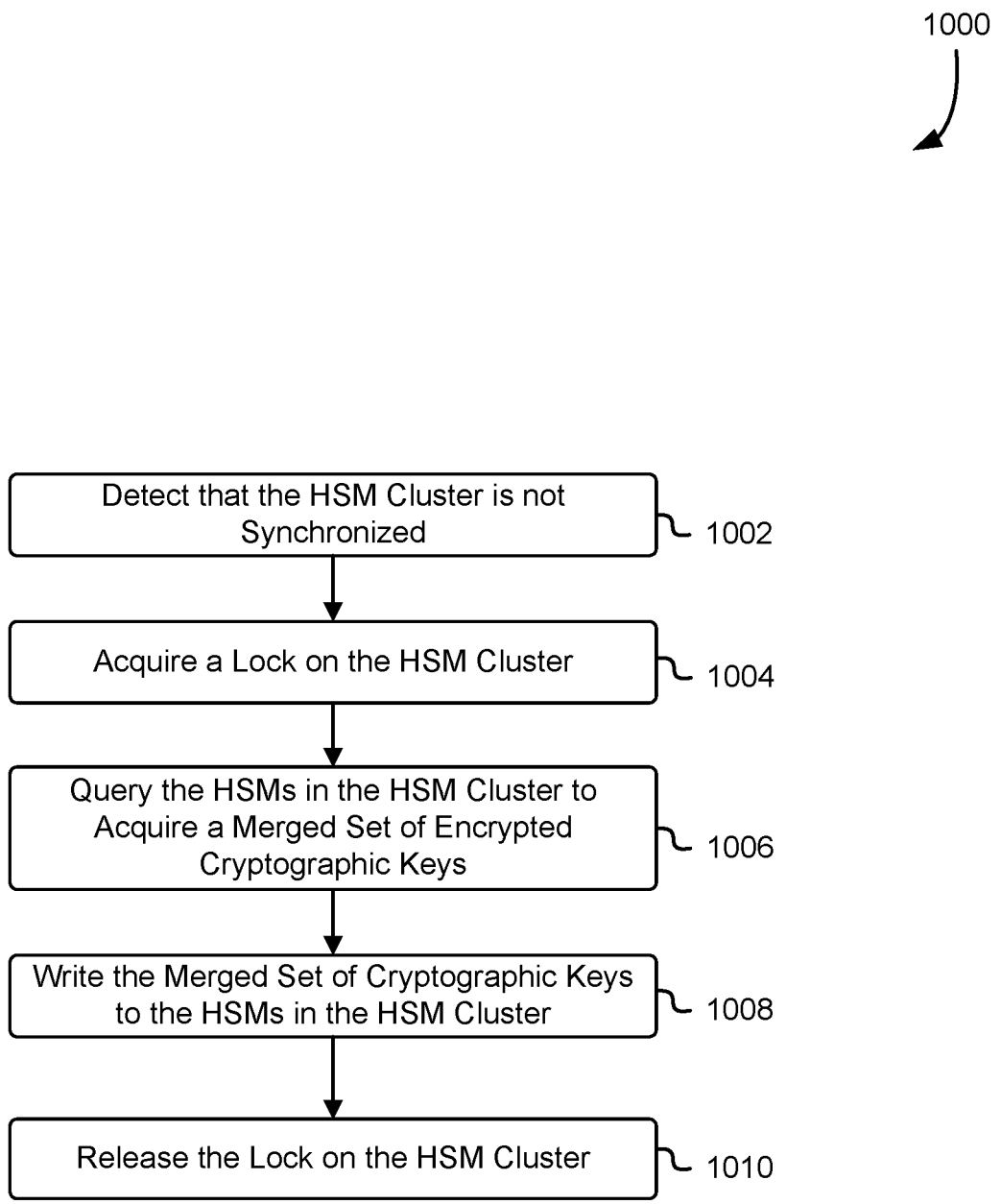
FIG. 10 shows an illustrative example of a process that, as a result of being performed by an HSM cluster client, synchronizes the state of an HSM cluster.

FIG. 10 shows an illustrative example of a process that, as a result of being performed by an HSM cluster client, synchronizes the state of an HSM cluster. A flowchart 1000 illustrates a process that begins at block 1002 where an HSM cluster client detects that the HSM cluster is not synchronized. The HSM cluster is not synchronized when the HSMs in the HSM cluster do not contain a matching set of cryptographic information. The HSM cluster client may detect that the HSM cluster is not synchronized by periodically polling the status of the HSM cluster from a HSM cluster server. In some implementations, the HSM cluster client is notified by an HSM cluster server that the HSM cluster is not synchronized as the result of a cryptographic operation not being replicated across the HSM cluster. As a result of detecting that the HSM cluster is not synchronized, the HSM cluster client attempts to reestablish synchronization for the HSM cluster.

At block 1004, the HSM cluster client acquires a lock on the HSM cluster. The lock prevents other applications, HSM cluster clients, and HSM cluster servers from performing modifications to the cryptographic keys maintained by the HSM. The lock may be implemented as a semaphore that is set by the HSM cluster client on each of the HSM cluster servers in the HSM cluster. In some examples, the lock may be implemented as a semaphore that is set on each HSM by the HSM cluster client. If the HSM cluster client is unable to acquire a lock on the HSM cluster, the HSM cluster client releases the semaphores that have been obtained, waits a random amount of time, and then checks to see if the HSM cluster is synchronized before reattempting to synchronize the HSM cluster.

At block 1006, after the HSM cluster client acquires a lock on the HSM cluster, the HSM cluster client queries each HSM in the HSM cluster and acquires an encrypted version of each cryptographic key in each HSM and the identifier associated with the encrypted version of each cryptographic key. The cryptographic keys are encrypted using a cluster key stored on the individual HSMs in the HSM cluster and not available outside the HSMs. The HSM cluster client merges the set of identifier-encrypted cryptographic key pairs into a merged set of encrypted cryptographic keys. If the HSM cluster client encounters different cryptographic keys with matching identifiers, the HSM cluster client resolves the conflict by identifying a master HSM for the identifier and the cryptographic key held by the master HSM governs. The master HSM is determined by extracting a prefix from the identifier and identifying the HSM associated with the prefix.

The HSM cluster client writes 1008 the merged set of encrypted cryptographic keys to the HSMs in the HSM cluster. The merged set of encrypted cryptographic keys is transmitted to the HSMS in the HSM cluster, and the HSMs overwrite their current cryptographic information with the merged set of encrypted cryptographic keys. In some implementations, the HSM cluster client identifies particular cryptographic keys that are missing or outdated from each HSM and transmits the particular cryptographic keys that are missing or outdated on each HSM to each HSM. After the HSM cluster client has reestablish synchronization across the HSM cluster, the HSM cluster client releases 1010 the lock on the HSM cluster and sets the state of the HSM cluster to synchronized.

Figure 11:
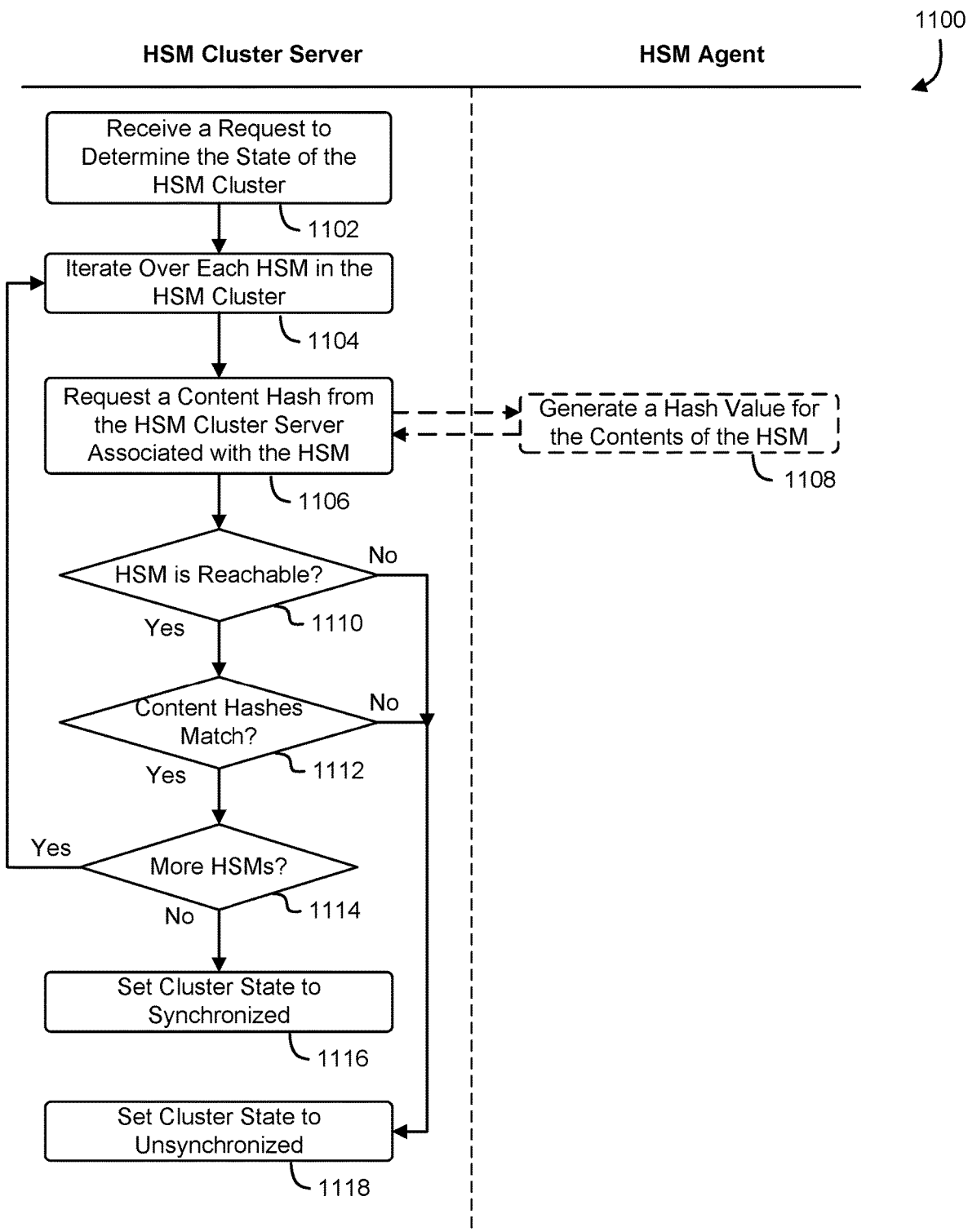
FIG. 11 shows an illustrative example of a process that, as a result of being performed by an HSM cluster server and an HSM, determines whether an HSM cluster is in a synchronized state.

FIG. 11 shows an illustrative example of a process that, as a result of being performed by an HSM cluster server and an HSM, determines whether an HSM cluster is in a synchronized state. A swim diagram 1100 illustrates a process that begins at block 1102 with an HSM cluster server receiving a request to determine the state of an HSM cluster. In some examples, the HSM cluster server receives the request to determine the state of an HSM cluster from an HSM cluster client. In another example, the HSM cluster server determines the state of the HSM cluster in response to a periodic event or timer expiration. At block 1104, the HSM cluster server iterates over each HSM in the HSM cluster. The HSM cluster server requests 1106 a contents hash from each HSM via an HSM cluster server associated with the HSM.

At block 1108, an HSM agent receives the request from the HSM cluster server and generates a hash value for the contents of the HSM. The contents of the HSM include the cryptographic keys, identifiers of the cryptographic keys, and properties of the cryptographic keys. The contents of the HSM are arranged in a determined order that can be maintained across all HSMs in the HSM cluster. In some implementations, the HSM contents are sorted in order of the identifiers associated with each of the cryptographic keys. The hash value of the contents of the HSM may be a cyclic redundancy code, a checksum, a hash code, a value determined with a one-way function, or a cryptographic hash of the contents of the HSM. The HSM agent provides the hash value to the HSM cluster server.

At decision block 1110, the HSM cluster server determines whether the HSM was reachable. If the HSM was not reachable, execution advances to block 1118 where a flag is set to indicate that the HSM cluster is in an unsynchronized state. At decision block 1112, the HSM cluster server determines whether the hash value received from the HSM matches hash values previously received from the other HSMs in the HSM cluster. If the hash value received from the HSM does not match hash values previously received from other HSMs in the HSM cluster, execution proceeds to block 1118, and a flag is set to indicate that the HSM cluster is in an unsynchronized state. If the hash value received from the HSM matches hash values previously received from other HSMs in the HSM cluster, or if no other hash values have been received from other HSMs in the HSM cluster during the current synchronization test, execution advances to decision block 1114. At decision block 1114, the HSM cluster server determines whether there are more HSMs in the HSM cluster, and if so, execution returns to block 1104 and additional HSMs are checked for synchronization. If no HSMs remain to be checked for synchronization, execution advances to block 1116 and a flag is set to indicate that the HSM cluster is in a synchronized state.

In various implementations, the HSM cluster server may periodically determine the state of synchronization of the HSM cluster. If the HSM cluster is determined to not be in a synchronized state, the HSM cluster server may notify additional HSM cluster servers in the HSM cluster. In some examples, the HSM cluster server notifies a synchronization client that is dedicated to performing resynchronization operation is for the HSM cluster.

Figure 12:
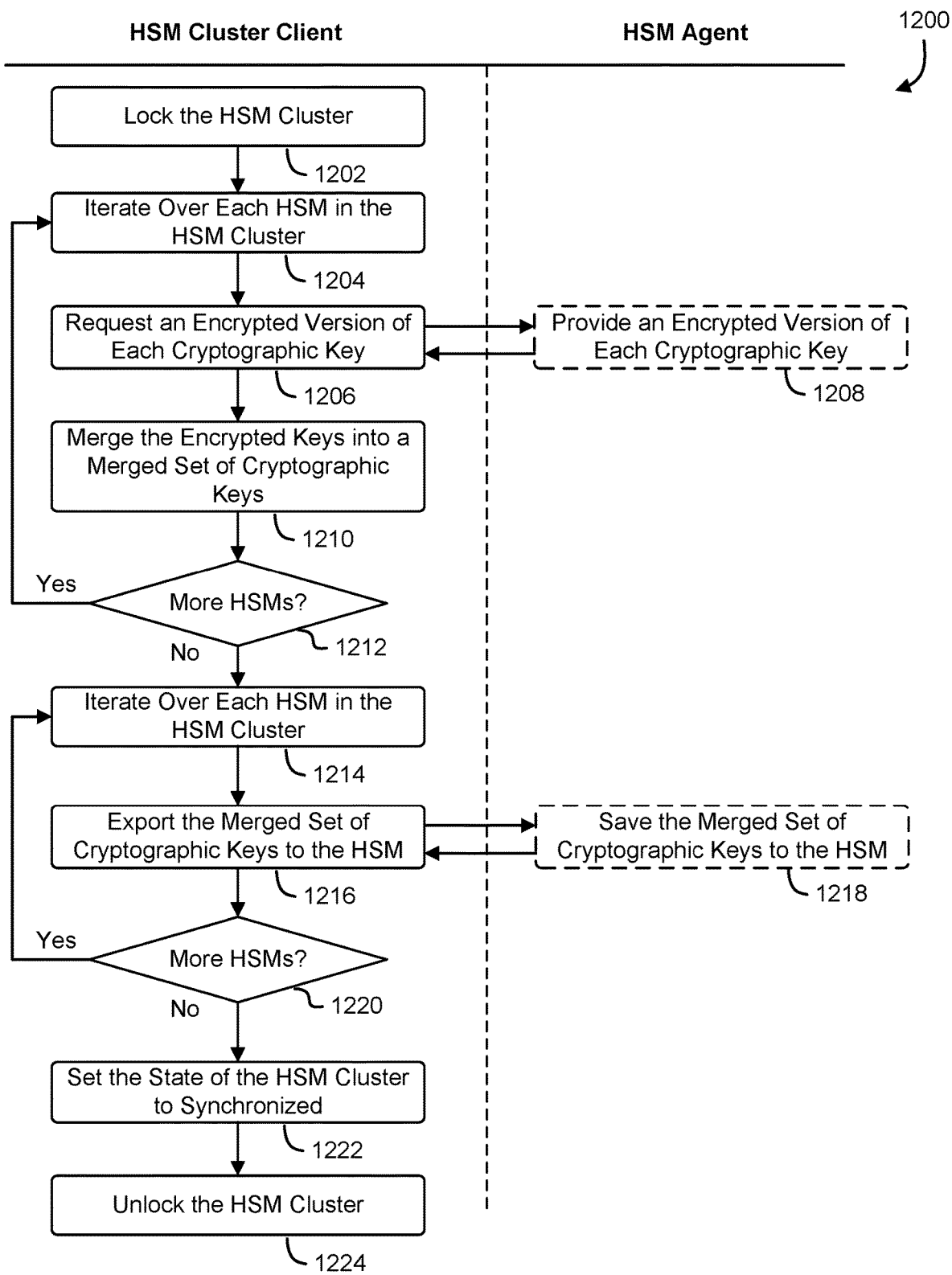
FIG. 12 shows an illustrative example of a process that, as a result of being performed by an HSM cluster client and an HSM, creates a merged set of cryptographic keys, and replicates the merged set of cryptographic keys across the HSM cluster.

FIG. 12 shows an illustrative example of a process that, as a result of being performed by an HSM cluster client and an HSM, creates a merged set of cryptographic keys and replicates the merged set of cryptographic keys across the HSM cluster. A swim diagram 1200 illustrates a process that begins at block 1202 where an HSM cluster client attempts to obtain a lock on the HSM cluster. To obtain the lock, the HSM cluster client contacts the HSM cluster servers and requests a semaphore on each HSM in the HSM cluster. If the HSM cluster client acquires a semaphore on the HSMs in the HSM cluster, a lock is achieved and execution may proceed. If the HSM cluster client does not acquire a semaphore on every HSM in the HSM cluster, a lock is not achieved and the semaphores are released. The HSM cluster client may wait for an amount of time before reattempting to establish a lock on the HSM cluster.

After the lock on the HSM cluster is achieved, execution advances to block 1204 where the HSM cluster client iterates over each HSM in the HSM cluster. The HSM cluster client requests 1206 an encrypted version of each cryptographic key maintained by each HSM in the HSM cluster. Each HSM, as a result of receiving the request, retrieves and encrypts each individual cryptographic key using a cluster key shared across to the HSMs in the HSM cluster. The individual encrypted cryptographic keys are provided 1208 in association with their key identifiers to the HSM cluster client as encrypted-cryptographic-key/key-identifier pairs. At block 1210, the HSM cluster client merges the encrypted-cryptographic-key/key-identifier pairs into a merged set of cryptographic keys. At decision block 1212 the HSM cluster client determines whether additional HSMs remain to be iterated, and if additional HSM's remain to be iterated, execution proceeds to block 1204 where additional HSMs provide their encrypted cryptographic keys to the HSM cluster client. After all HSMs have been iterated, execution advances to block 1214.

At block 1214, the HSM cluster client re-iterates over each HSM in the HSM cluster. The HSM cluster client sends 1216 the merged set of encrypted cryptographic keys to each HSM in the HSM cluster. Each HSM, as a result of receiving the merged set of cryptographic keys, decrypts each individual cryptographic key using a cluster key shared across to the HSMs in the HSM cluster. The individual encrypted cryptographic keys are stored in non-exportable memory in the HSMs at block 1218. At decision block 1220 the HSM cluster client determines whether additional HSMs remain to be iterated, and if additional HSMs remain to be iterated, execution proceeds to block 1214 where the merged set of cryptographic keys is provided to additional HSMs. After all HSMs have been iterated, execution advances to block 1222.

At block 1222, provided that the merged set of cryptographic keys have been successfully exported to the HSMs in the HSM cluster, the HSM cluster client sets the state of the HSM cluster to synchronized. In some examples, the state of the HSM cluster is maintained by the HSM cluster servers, and the HSM cluster client broadcast the state of the synchronization operation to the HSM cluster servers to set the state of the HSM cluster. At block 1224, the HSM cluster client releases the lock on the HSM cluster.

Figure 13:
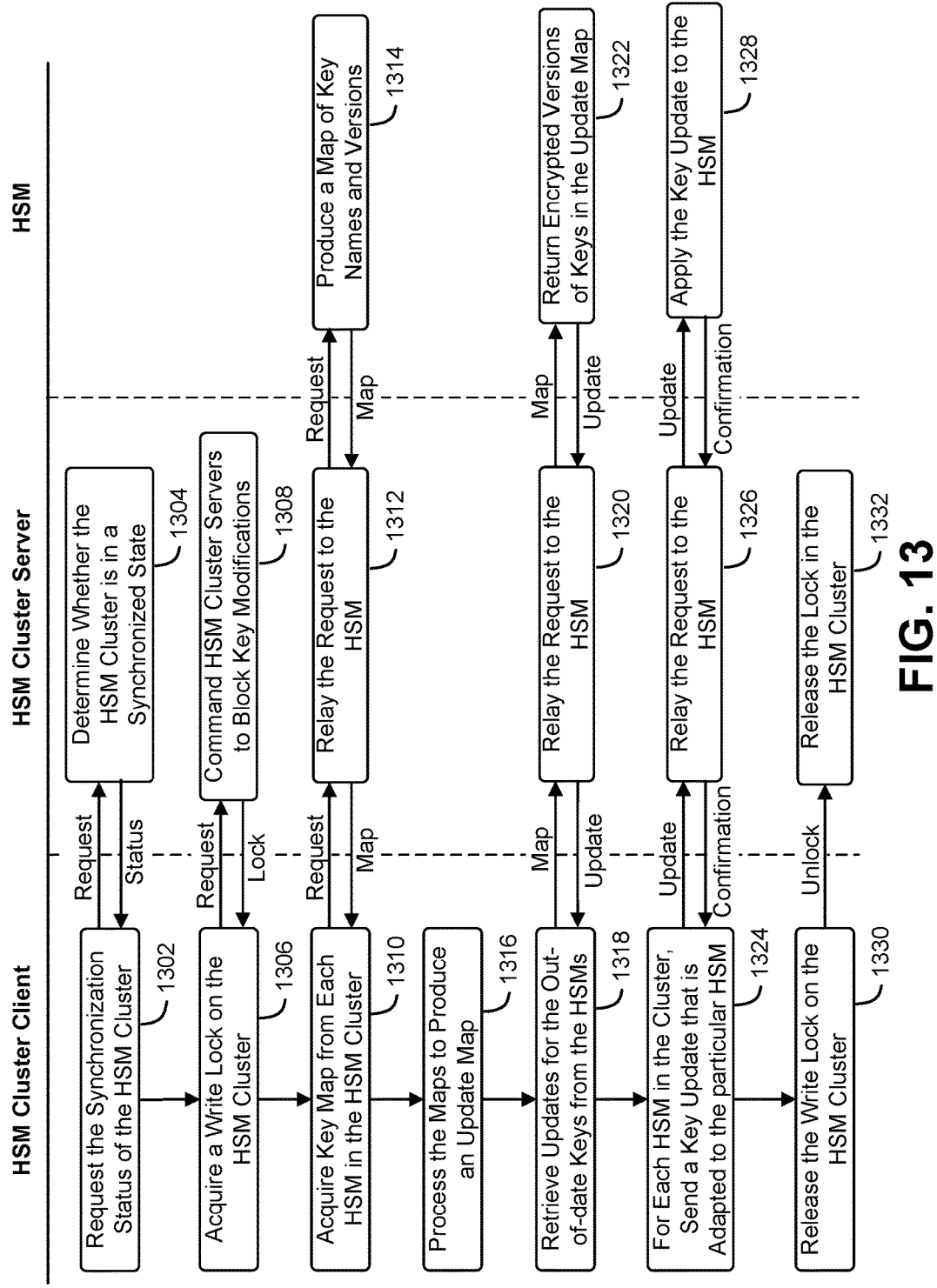
FIG. 13 shows an illustrative example of a process that, as a result of being performed by an HSM cluster client, an HSM cluster server, and an HSM, resynchronizes cryptographic keys stored on HSMs in an HSM cluster.

FIG. 13 shows an illustrative example of a process that, as a result of being performed by an HSM cluster client, an HSM cluster server, and an HSM, resynchronizes cryptographic keys stored on HSMs in an HSM cluster. A swim diagram 1300 shows a process that begins at block 1302 with an HSM cluster client querying the synchronization status of an HSM cluster. The HSM cluster server receives 1304 the request, and determines whether the HSMs in the HSM cluster have matching cryptographic keys. In some examples, the HSM cluster server maintains a synchronization status flag that is updated in response to processing cryptographic hashes of HSM contents received from other HSMs in the HSM cluster, and the HSM cluster server returns the synchronization status flag to the HSM cluster client in response to the request. In other examples, in response to the request, the HSM cluster server acquires a cryptographic hash of the HSM managed by the HSM cluster server, and compares the cryptographic hash to cryptographic hashes of the remaining HSMs in the HSM cluster. If the cryptographic hashes of the HSMS in the HSM cluster match, the HSM cluster server determines that the HSM cluster is synchronized. If the cryptographic hashes of the HSMs in the HSM cluster do not match, the HSM cluster server determines that the HSM cluster is not synchronized. The synchronization status of the HSM cluster is returned to the HSM cluster client. If the HSM cluster client receives an indication from the HSM cluster server that the HSM cluster is not synchronized, execution advances to block 1306.

At block 1304, if the HSM cluster server indicates that the HSM cluster is not synchronized, the HSM cluster client attempts to acquire a write-lock on the HSM cluster. To acquire the write-lock, the HSM cluster client sends a request to the HSM cluster server. The HSM cluster server blocks 1308 additions and modifications to the cryptographic keys on the HSM. In some examples, the HSM cluster server sends a write-lock request to the remaining HSM cluster servers, so that the write-lock is imposed cluster-wide. In another example, the HSM cluster client sends a write-lock request to the remaining HSM cluster servers, thereby imposing the write-lock cluster wide. The write-lock prevents other HSM clients from altering the cryptographic keys stored on the HSMs in the HSM cluster.

At block 1310, the HSM cluster client acquires a key map from each HSM in the HSM cluster. The HSM cluster client acquires the key map by submitting a request to each HSM via a corresponding HSM cluster server. The HSM cluster server receives and relays 1312 the request to the corresponding HSM, and the HSM produces 1314 the key map. The key map includes a list of the cryptographic keys retained by the HSM, and the versions of each cryptographic key retained by the HSM. The key map is returned by the HSM to the HSM cluster server, and the HSM cluster server relays the key map to the HSM cluster client.

At block 1316, after acquiring the key maps from the HSMs in the HSM cluster, the HSM cluster client processes the maps to produce an update map. The update map includes a list of the cryptographic keys that are not synchronized across the HSM cluster, the most-recent version of each non-synchronized cryptographic key, and a location where the most-recent version of each non-synchronized cryptographic key may be found. In some examples, the HSM cluster client generates the update map by merging the key maps into a single map, and then removing those keys that are synchronized from the single map. Finally, the HSM cluster client removes out-of-date keys from the single map leaving a map of keys that are not synchronized across the HSM cluster, and a list of HSMs where the most-recent version of the unsynchronized keys may be found. In another example, the HSM cluster client retrieves a cryptographic hash representing the contents of each HSM, and arranges the HSMs into groups based on the cryptographic hash. For each HSM group, the HSM cluster client selects a representative HSM and collects the key map from each representative HSM. The key maps are merged to create an update map that includes the most-recent version of each unsynchronized key, and an HSM group where the most recent version of each unsynchronized key may be found.

At block 1318, the HSM cluster client uses the update map to acquire the most up-to-date version of each out-of-sync cryptographic key. In some examples, the HSM cluster client sends the update map to each HSM in the HSM cluster via a corresponding HSM cluster server. The HSM cluster server receives 1320 the update map from the HSM cluster client and relays the update map to the HSM. The HSM receives 1322 the update map, and in response, identifies cryptographic keys from the update map that are in the possession of the HSM, and returns an update to the HSM cluster client via the HSM cluster server. The update includes the value of one or more cryptographic keys, encrypted with a cryptographic key known to the other HSMs in the HSM cluster.

At block 1324, the HSM cluster client produces a key update for each HSM in the HSM cluster, and sends the update to the HSM. Using the key map acquired from each HSM and the update map, the HSM cluster client identifies keys that are out of date for each HSM, and assembles a key update using the encrypted updated keys received from the HSMs. Once the key update is produced, it is sent to the HSM via the corresponding HSM cluster server. The HSM cluster server receives 1326 the update and relay to the HSM. Upon receiving the update, the HSM applies 1328 the update. The encrypted cryptographic keys in the update are decrypted using a cryptographic key on the HSM, and the updated cryptographic keys are added and/or updated in accordance with the contents of the update. After the updates are applied to the HSMs, the HSM cluster is returned to a synchronized state.

At block 1330, after the updates are applied the HSM cluster client releases the write lock on the HSM cluster by sending an unlock request to one or more HSM cluster servers. In some examples, the HSM cluster client sends an unlock request to the HSM cluster server, and the HSM cluster server releases 1332 the write lock on the HSM cluster server, and relays the unlock request to the other HSM cluster servers in the HSM cluster. In other examples, the HSM cluster client sends an unlock request to each HSM cluster server in the HSM cluster.

Figure 14:
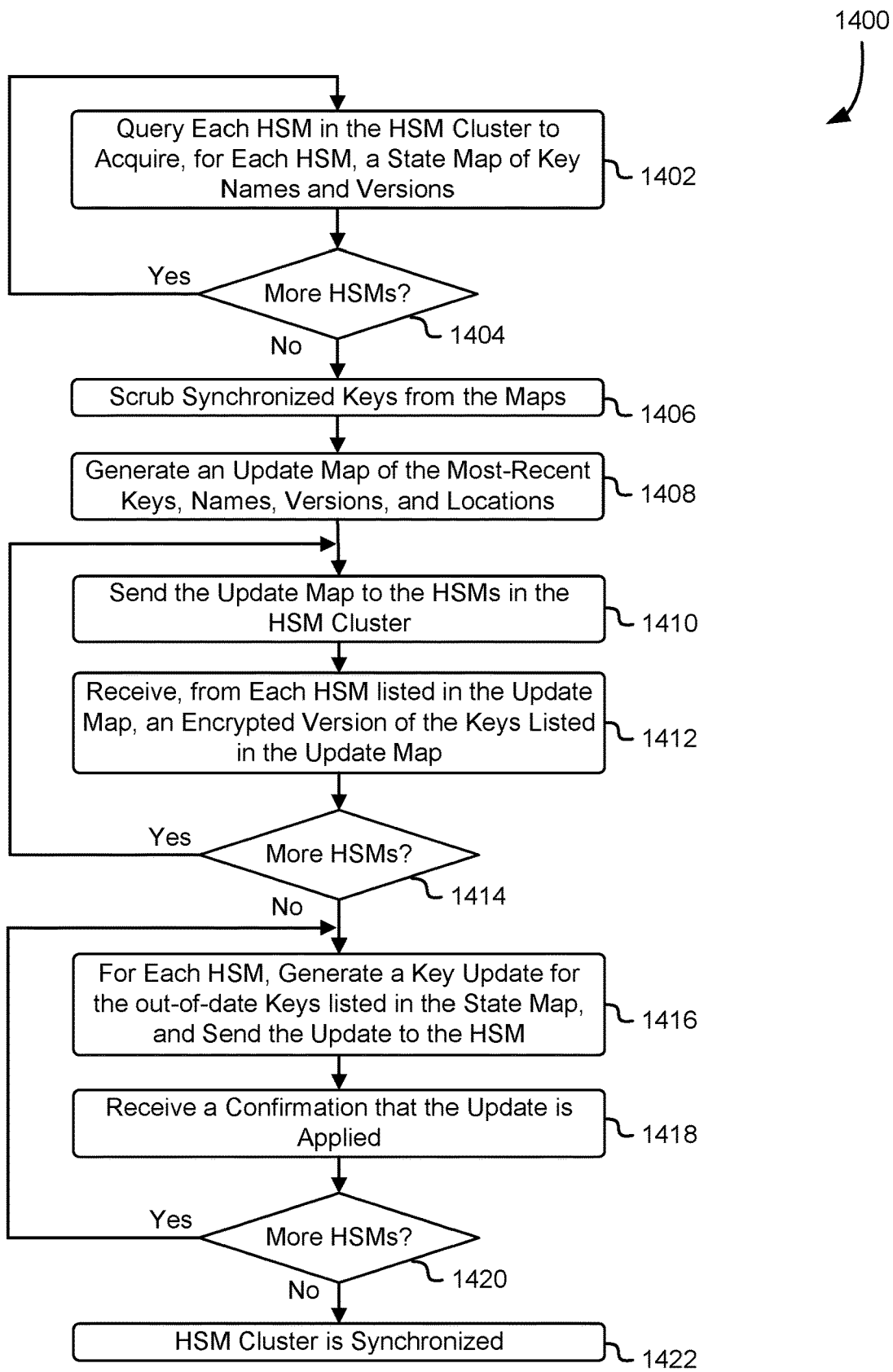
FIG. 14 shows an illustrative example of a process that, as a result of being performed by an HSM cluster client, produces a key update for each out-of-sync HSM in an HSM cluster that returns the HSM cluster to a synchronized state.

FIG. 14 shows an illustrative example of a process that, as a result of being performed by an HSM cluster client, produces a key update for each out-of-sync HSM in an HSM cluster that returns the HSM cluster to a synchronized state. A flowchart 1400 illustrates a process that begins at block 1402 with an HSM cluster client sending a query to each HSM in an HSM cluster. For each HSM in the HSM cluster, the query returns key map that identifies the name and version of each cryptographic key on the HSM. At decision block 1404, the HSM cluster client determines whether there are additional HSMs in the HSM cluster to query. After key maps for the HSMs in the HSM cluster have been acquired, execution advances to block 1406.

At block 1406, the HSM cluster client processes the key maps by removing keys that are synchronized across the HSM cluster. If the key name and version appears in all of the key maps, it is removed from all of the key maps because the key exists is synchronized across the HSM cluster. At block 1408, the HSM cluster client uses the scrubbed key maps to generate an update map. The update map is a map of cryptographic keys that are not synchronized across the entire HSM cluster, the latest versions of those cryptographic keys, and the location of the most up-to-date cryptographic keys. For example, if a first HSM has version 1 of a particular cryptographic key, and a second HSM has version 2 of a particular cryptographic key, and a third HSM has version 3 of a particular cryptographic key, the update map will contain the name of the particular cryptographic key, the version number 3, and the name of the third HSM are contained in the update map.

At block 1410, the HSM cluster client begins sending the update map to the HSMs in the HSM cluster. After the update map is sent to each HSM, the HSM cluster client receives 1412 a response from the HSM that includes an encrypted version of any keys retained by the HSM which are listed in the update map. At decision block 1414, the HSM cluster client determines whether there are more HSMs in the HSM cluster that is not yet been provided with the update map and if so, returns to block 1410. In some examples, the HSM cluster client sends the update map to all HSMs in the HSM cluster. In other examples, the HSM cluster client sends the update map to various HSMs in the HSM cluster until every cryptographic key in the update map has been acquired by the HSM cluster client.

At block 1416, the HSM cluster client iterates through each HSM in the HSM cluster. For each iterated HSM, the HSM cluster client generates a key update to bring the particular HSM up-to-date. Using the update map, the encrypted versions of the cryptographic keys, and the key map of the particular HSM, the HSM cluster client generates an update that includes those keys that are not up-to-date on the particular HSM, and sends the update to the particular HSM. The HSM applies the update, bringing the HSM up-to-date with the other HSMs in the HSM cluster, and returns a confirmation to the HSM cluster client. At block 1418, the HSM cluster client receives the confirmation that the update has been successfully applied. At decision block 1420, the HSM cluster client determines whether additional HSMs need to be updated and if so, execution returns to block 1416. After the HSMs are updated execution is advances to block 1422 and the HSM cluster is returned to a synchronized state.

Figure 15:
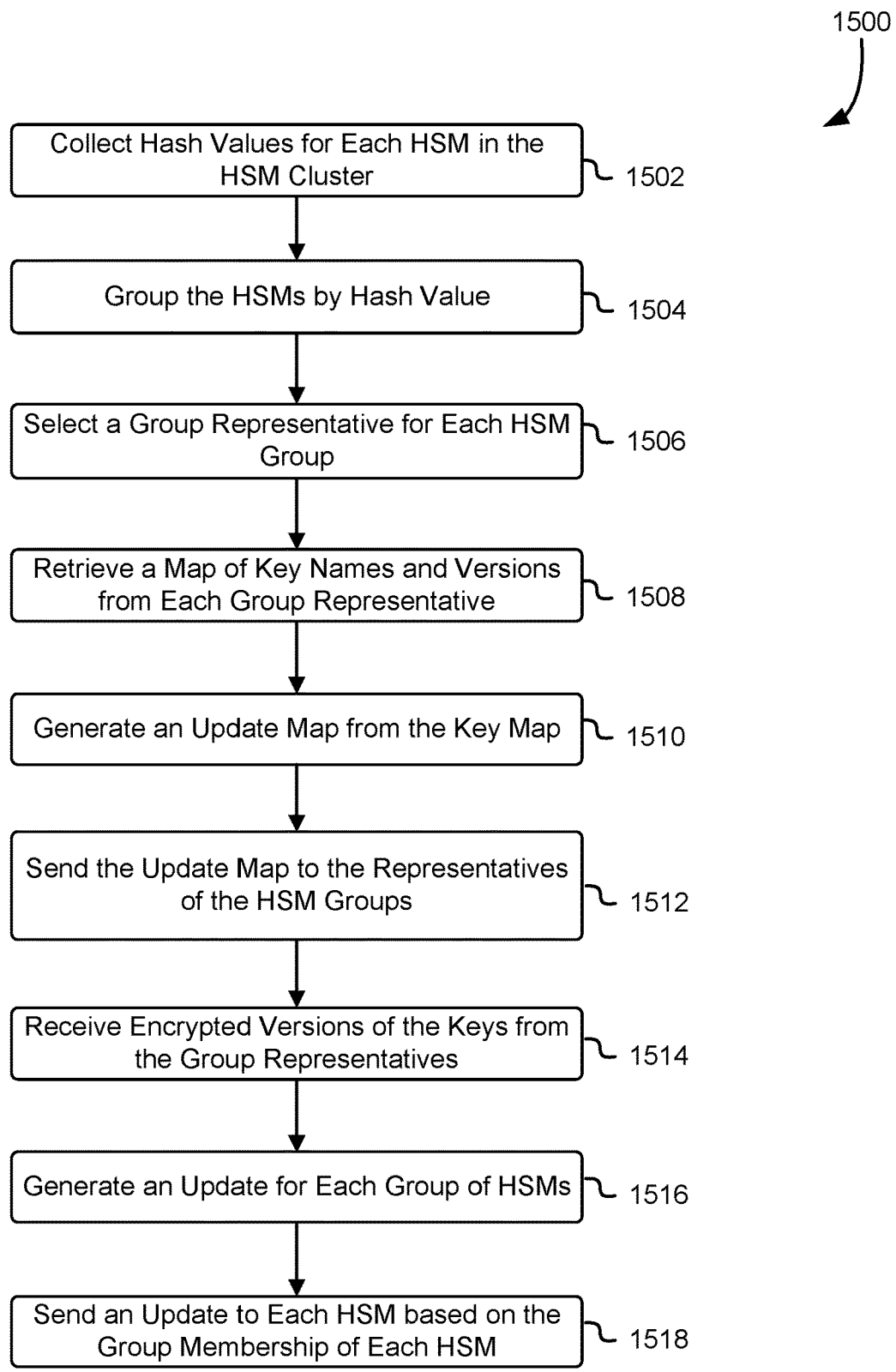
FIG. 15 shows an illustrative example of a process that, as a result of being performed by an HSM cluster client, groups HSMs in an HSM cluster into a number of groups based at least in part on a hash of each HSM's contents, and produces a key update for each HSM group that returns the HSM cluster to a synchronized state.

FIG. 15 shows an illustrative example of a process that, as a result of being performed by an HSM cluster client, groups HSMs in an HSM cluster into a number of groups based at least in part on a hash of each HSM's contents, and produces a key update for each HSM group that returns the HSM cluster to a synchronized state. A flowchart 1500 shows a process that begins at block 1502 with an HSM cluster client collecting a hash value for each HSM in an HSM cluster. The hash value is a hash or checksum of the cryptographic keys retained on each HSM. At block 1504, the HSM cluster client assigns the HSMs in the HSM cluster into groups based on the hash associated with each HSM, each group containing HSMs with matching hashes. At block 1506, the HSM cluster client designates a representative HSM for each HSM group. In some examples, the representative HSM is chosen at random. In other examples, the representative HSM is chosen by selecting an HSM from each HSM group that is most accessible to the HSM cluster client or that has a lower utilization compared to other HSMs in the HSM group.

At block 1508, the HSM cluster client retrieves a map of key names and versions from each representative of an HSM group. Using the map of key names and versions, the HSM cluster client generates 1510 and update map containing a list of key names that are not synchronized across the HSM cluster, the latest version of each cryptographic key. The update map is sent 1512 to the representative of each HSM group, and the representative returns encrypted versions of any cryptographic keys listed in the update map. At block 1514, the HSM cluster client receives the updates containing the encrypted versions of the most-recent keys from the representatives of the HSM groups. At block 1516, the HSM cluster client generates an update for each HSM group based on the key map of the representative of each HSM group, the update map, and the encrypted versions of the most-recent keys. The update generated for each representative is sent 1518 to all the HSMs in the HSM group represented by the representative to update all the HSMs in the HSM group. When individual updates have been generated for each representative HSM, and sent to the members of their corresponding HSM groups, the HSM cluster has been returned to a synchronized state.

Figure 16:
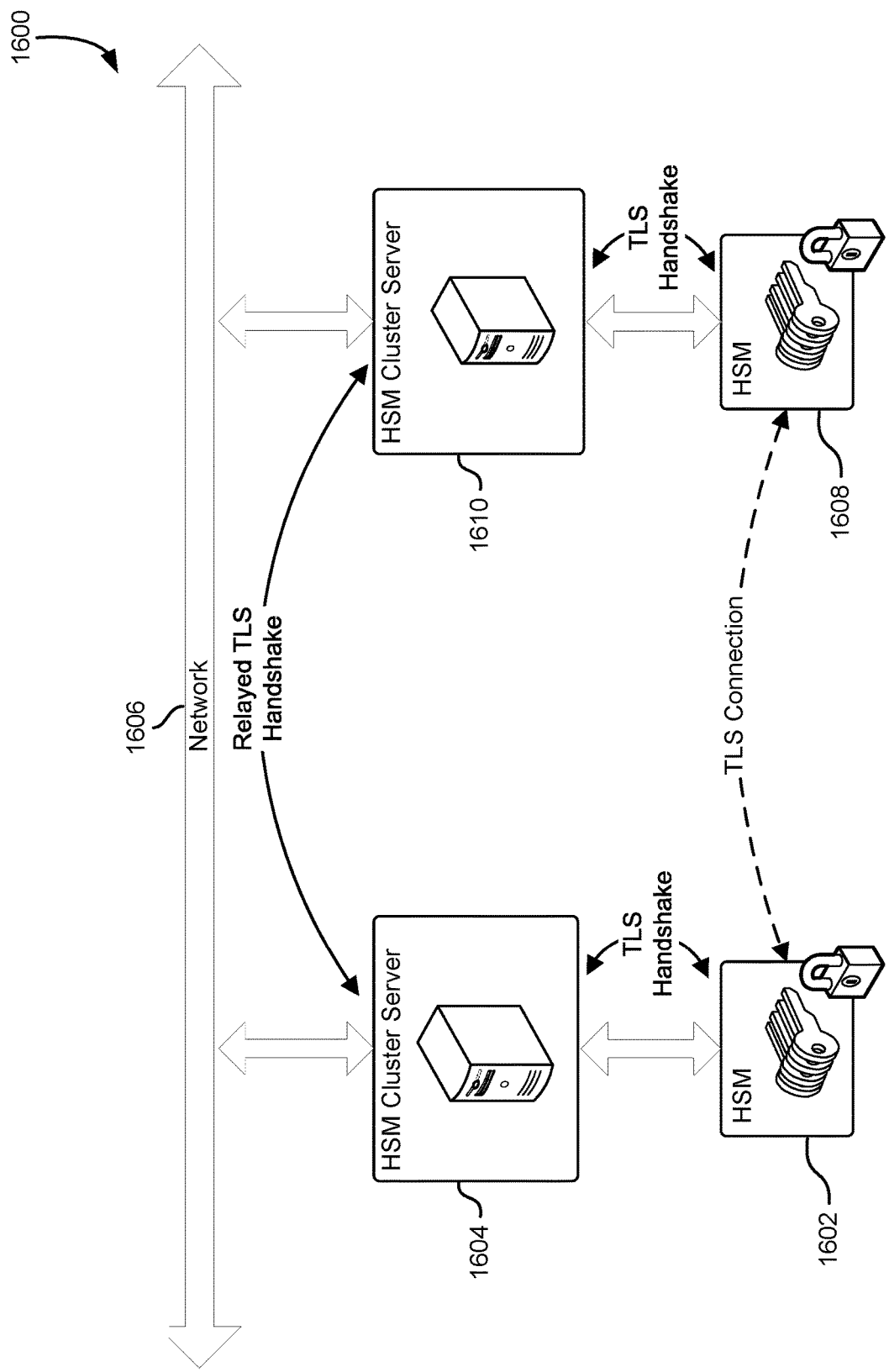
FIG. 16 shows an illustrative example of an HSM cluster with two HSMs that establish an encrypted communication channel through their respective HSM hosts while not revealing the contents of their communications to their respective HSM hosts.

FIG. 16 shows an illustrative example of an HSM cluster with two HSMs that establish an encrypted communication channel through their respective HSM hosts while not revealing the contents of their communications to their respective HSM hosts. A system diagram 1600 shows a first HSM 1602 that is connected to a first HSM cluster server 1604. The first HSM cluster server 1604 may be connected to the first HSM 1602 with the USB connection, serial connection, a FireWire connection, or backplane. The HSM first cluster server 1604 is a computer system containing a network interface that connects to a computer network 1606. A second HSM 1608 is connected to a second HSM cluster server 1610. The first HSM cluster server 1604 and the second HSM cluster server 1610 communicate with each other via the computer network 1606.

The first HSM 1602 and the second HSM 1608 may communicate with each other via an encrypted communication channel. The encrypted communication channel is established by the HSMs with the cooperation of their respective HSM cluster servers, but the HSMs do not rely on their respective hosts to ensure the integrity of the encrypted channel. The HSM cluster servers relay network messages between their respective HSMs and the computer network 1606. The HSMs establish a shared secret with each other that is not known to either of the HSM cluster servers, and the shared secret is used as a basis to create a symmetric cryptographic key accessible to each of the HSMs, but not accessible to either of the HSM cluster servers. The symmetric cryptographic key is used to encrypt and decrypt messages which are sent to the HSMs.

In some examples, the shared secret is established by performing a Diffie-Hellman key exchange process between the HSMs. The set of key-exchange parameters are sent from the first HSM 1602 to the first HSM cluster server 1604. The first HSM cluster server 1604 relays the key-exchange parameters to the second HSM cluster server 1610 via the computer network 1606. After receiving the key-exchange parameters, the second HSM cluster server 1610 provides the key-exchange parameters to the second HSM 1608. The second HSM 1608 generates a key-exchange solution based on the key-exchange parameters, and sends the key-exchange solution to the second HSM cluster server 1610. The second HSM cluster server 1610 relays the key-exchange solution to the first HSM cluster server 1604 via the computer network 1606. After receiving the key-exchange solution, the first HSM cluster server 1604 relays the key-exchange solution to the first HSM 1602. Using the key-exchange solution and the key-exchange parameters, both the first HSM 1602 and the second HSM 1608 generate a shared secret that is not available to either of the HSM cluster servers or any other eavesdropper. Variations on the Diffie-Hellman key exchange process are also applicable such as elliptic curve Diffie-Hellman and ephemeral elliptic curve Diffie-Hellman processes.

In yet another example, the shared secret is established between the HSMs using an asymmetric-key process. Each HSM obtains a digital certificate for the other HSMS in the cluster. Each digital certificate contains a public cryptographic key corresponding to a private cryptographic key under the control of a corresponding HSM in the HSM cluster. To communicate with another HSM in the HSM cluster, and HSM encrypts outgoing messages with the public key corresponding to the destination HSM. Upon receipt, the destination HSM decrypts the incoming message with the private key of the destination HSM. The digital certificates may be signed by a certificate authority known to the HSMs in the HSM cluster, and the signature of the certificate authority may be verified by the individual HSMs to confirm the authenticity of the digital certificates. In some implementations, the shared secret may be encrypted with a public cryptographic key and sent to another HSM to establish a shared secret, and the shared secret used to generate a symmetric key that is used for additional communications.

In some implementations, the HSMs implement the version of the transport layer security ("TLS") protocol. TLS handshake messages are relayed between the HSMs via the HSM cluster servers, and once the TLS handshake is complete between the HSMs, the HSMs operate in accordance with the TLS record protocol by using a symmetric cryptographic key derived from the shared secret.

In some examples, the HSMs provide authentication information to each other that allow each HSM to authenticate the identity of the other HSM. The authentication information may be a digital certificate such as an X.509 digital certificate signed by a trusted certificate authority, or digital signature based on a public-private key pair controlled by the HSMs in the HSM cluster.

In some examples, the creation of logical connections between HSMs is facilitated by a directory database that is accessible to each HSM. A copy of the directory database may reside within each HSM or the directory may be accessible at a shared storage location. The directory includes information that describes how each HSM can be contacted. In some implementations, HSM cluster servers maintain an open socket on an IP address, and data packets received on the open socket are routed to the HSM corresponding to the HSM cluster server. The particular socket and IP address for each HSM are published in the directory. When a particular HSM wants to contact another HSM, the particular HSM includes information that identifies the IP address and socket to which the outgoing connection is initiated. In some examples, the information is the IP address and socket of the destination HSM's HSM cluster server. In other examples, the particular HSM initiating the outgoing connection identifies the destination HSM using a name or other associated identifier, the HSM cluster server receives the request for the outgoing connection and uses the identifier to look up the destination IP address and port in the directory database. The HSM cluster server then initiates the connection to the port and address associated with the destination HSM cluster server, and the destination HSM cluster server relays the packets to the destination HSM. Return packets are sent via the reciprocal path, which is identified in the outgoing packet. For example, the outgoing packet from the HSM that initiated the connection includes the name of the HSM or the IP address and socket used for the return path.

Figure 17:
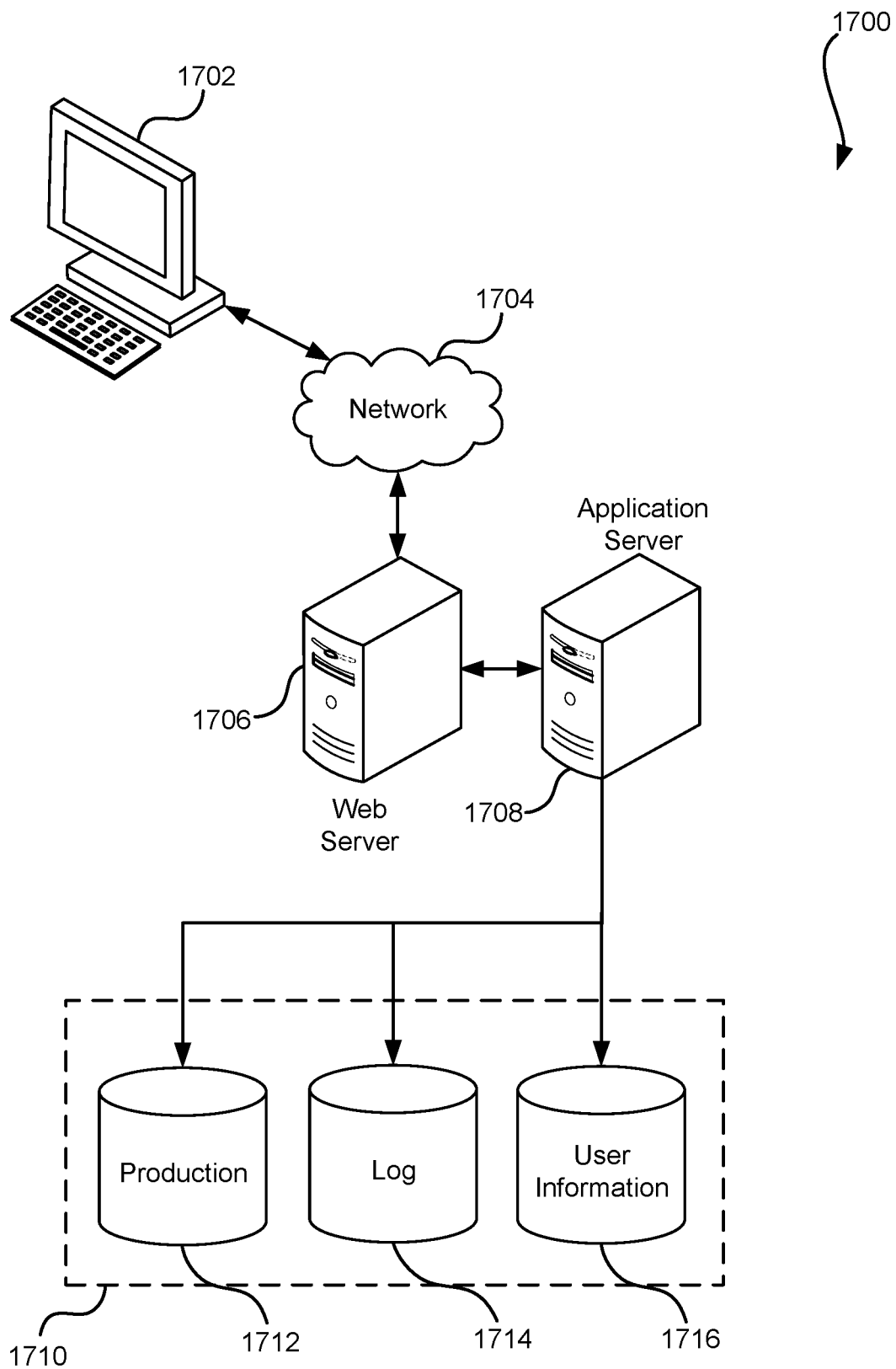
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages, or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1702 and the application server 1708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes, and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Python or TCL, as well as combinations thereof. The server(s) may also include database servers, including without limitation those commercially available from Oracle®, Microsoft®, Sybase®, and IBM® as well as open-source servers such as My SQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stem signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x1$, the probably of randomly generating another input $x2$, different from $x1$, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method; comprising:
   generating a key map including information associated with a set of keys maintained by a cluster of hardware security modules by acquiring from the cluster of hardware security modules key names and key versions retained by the cluster of hardware security modules;
   generating an update map from the key map indicating a subset of keys of the set of keys out of synchronization with at least one other hardware security module of the cluster of hardware security modules;
   determining a subset of hardware security modules of the cluster of hardware security modules to provide an update including a set of encrypted cryptographic keys corresponding to the subset of keys;
   generating the update for a first hardware security module of the subset of hardware security modules, the update including a subset of encrypted cryptographic keys of the set of encrypted cryptographic keys based at least in part on the key map and the update map; and
   causing the first hardware security module to update cryptographic-key information retained on the first hardware security module to include the subset of encrypted cryptographic keys by at least providing the update to the first hardware security module.

2. The computer-implemented method of claim 1, wherein generating the key map further comprises merging a set of key maps obtained from the cluster of hardware security modules.

3. The computer-implemented method of claim 2, wherein merging the set of key maps further comprises:
   removing a synchronized cryptographic key from the set of key maps; and
   removing an out-of-date cryptographic key from the set of key maps.

4. The computer-implemented method of claim 1, wherein generating the key map further comprises:
   obtaining a hash of the content of a hardware security module of the cluster of hardware security modules; and
   placing the hardware security module in a group based at least in part on the hash, where the key map is generated based at least in part on key names and key versions retained by a representative hardware security module of the group in order to generate a partition of the cluster of hardware security modules.

5. The computer-implemented method of claim 1, wherein the computer-implemented method further comprises obtaining, from an up-to-date hardware security module of the cluster of hardware security modules, the set of encrypted cryptographic keys corresponding to the subset of keys; and
   including the set of encrypted cryptographic keys in the update.

6. The computer-implemented method of claim 1, wherein the computer-implemented method further comprises determining that the subset of keys of the set of keys is out of synchronization with the at least one other hardware security module of the cluster of hardware security modules by at least:
   obtaining a set of checksums corresponding to contents of the cluster of hardware security modules; and
   determining that the subset of keys of the set of keys is out of synchronization as a result of at least two checksums of the set of checksums not matching.

7. A system, comprising:
   one or more processors; and
   memory storing computer-executable instructions that, as a result of being performed by one or more processors, cause the system to:
      generate a key map associated with a set of keys of a cluster of hardware security modules, the key map including information identifying individual keys of the set of keys;
      generate an update to a first hardware security module of the cluster of hardware security modules, the update includes at least one key of the set of keys out of synchronization with a second hardware security module of the cluster of hardware security modules;
      obtain an encrypted version of the at least one key; and
      cause the first hardware security module to update cryptographic information maintained by the first hardware security module to include a decrypted version of the encrypted version of the at least one key by at least providing the first hardware security module with the update and the encrypted version of the at least one key.

8. The system of claim 7, wherein generating the key map further comprises obtaining the information identifying individual keys of the set of keys from individual hardware security modules of the cluster of hardware security modules and including the information in the key map.

9. The system of claim 8, wherein the computer-executable instructions that cause the system to generate the key map further include computer-executable instructions that, as a result of being performed by one or more processors, cause the system to merge the information identifying individual keys of the set of keys from the individual hardware security modules into the key map.

10. The system of claim 7, wherein the information identifying individual keys of the set of keys include key version information and key name information.

11. The system of claim 7, wherein the computer-executable instructions that cause the system to obtain the encrypted version of the at least one key further include computer-executable instructions that, as a result of being performed by one or more processors, cause the system to:
    identify, based at least in part on the key map a representative hardware security module; and obtain the at least one key from the representative hardware security module.

12. The system of claim 11, wherein the memory further stores computer-executable instructions that, as a result of being performed by one or more processors, cause the system to select the representative hardware security module based at least in part on a utilization measure associated with the representative hardware security module.

13. The system of claim 7, wherein the memory further stores computer-executable instructions that, as a result of being performed by one or more processors, cause the system to obtain a hash of the contents of the first hardware security module to determine that the first hardware security module is out of synchronization with the second hardware security module.

14. The system of claim 13, wherein the memory further stores computer-executable instructions that, as a result of being performed by one or more processors, cause the system to generate a comparison of the hash of the contents of the first hardware security module with the hash of the contents of a representative hardware security module of the cluster of hardware security modules; and
wherein generating the update is based at least in part on the comparison of the hash of the contents of the first hardware security module with the hash of the contents of the representative hardware security module.

15. The system of claim 7, wherein the computer-executable instructions that cause the system to generate the update further include computer-executable instructions that, as a result of being performed by one or more processors, cause the system to:
identify the at least one key based at least in part on a key name associated with the at least one key indicated in the key map; and
cause a hardware security module cluster server associated with the cluster of hardware security modules to generate the encrypted version of the at least one key by at least obtaining the at least one key from the second hardware security module and encrypting the at least one key to generate the encrypted version of the at least one key using a key accessible to the cluster of hardware security modules.

16. A non-transitory computer-readable storage medium storing executable instructions that, as a result of being executed by one or more processors of a computer system, cause the computer system to at least:
obtain information indicating cryptographic keys contained in a cluster of hardware security modules by acquiring an inventory of retained cryptographic keys including cryptographic key versions;
generate a key map based at least in part on the information, the key map identifying a set of cryptographic keys that are unsynchronized with at least one hardware security module of the cluster of hardware security modules;
generate an update including a set of encrypted cryptographic keys based at least in part on the key map; and
provide the update to the at least one hardware security module of be cluster of hardware security modules.

17. The non-transitory computer-readable storage medium of claim 16, wherein the instructions further comprise instructions that, as a result of being executed by the one or more processors, cause the computer system to obtain a set of hashes of a subset of cryptographic keys of the set of cryptographic keys contained in the at least one hardware security module of the cluster of hardware security modules, the set of hashes usable to determine the at least one hardware security module is unsynchronized.

18. The non-transitory computer-readable storage medium of claim 16, wherein the information indicating cryptographic keys includes at least a key name and a key version of at least one cryptographic key contained in a hardware security module of the cluster of hardware security modules.

19. The non-transitory computer-readable storage medium of claim 16, wherein the instructions further comprise instructions that, as a result of being executed by the one or more processors, cause the computer system to, prior to obtaining information indicating cryptographic keys, transmit a request to the cluster of hardware security modules to implement a write-lock.

20. The non-transitory computer-readable storage medium of claim 16, wherein the instructions further comprise instructions that, as a result of being executed by the one or more processors, cause the computer system to obtain the set of encrypted cryptographic keys from at least one security module of the cluster of hardware security modules by at least querying a hardware security module cluster of the set of cryptographic keys based at least in part on information indicating cryptographic keys included in the key map.

* * * * *